United States Patent [19]
Petty

[11] Patent Number: 4,965,796
[45] Date of Patent: Oct. 23, 1990

[54] MICROPROCESSOR-BASED SUBSTRATE MULTIPLEXER/DEMULTIPLEXER

[75] Inventor: Norman W. Petty, Boulder, Colo.

[73] Assignee: AT&T Bell Laboratories, Murray Hill, N.J.

[21] Appl. No.: 415,144

[22] Filed: Sep. 29, 1989

[51] Int. Cl.[5] .............................................. H04J 3/22
[52] U.S. Cl. ....................................... 370/112; 370/84
[58] Field of Search ................... 370/112, 84, 99, 79, 370/95.1, 82, 58.1–58.3, 85.12; 375/38, 117

[56] References Cited

U.S. PATENT DOCUMENTS

| | | | |
|---|---|---|---|
| 4,206,322 | 6/1980 | Lurtz | 370/63 |
| 4,445,213 | 4/1984 | Baugh et al. | 370/85.12 |
| 4,446,555 | 5/1984 | Devault et al. | 370/94 |
| 4,485,468 | 11/1984 | Slana | 370/58 |
| 4,530,093 | 7/1985 | Akram et al. | 370/85 |
| 4,535,451 | 8/1985 | Drupsteen | 370/99 |
| 4,547,877 | 10/1985 | Lehman et al. | 370/58 |
| 4,577,312 | 3/1986 | Nash | 370/79 |
| 4,589,108 | 5/1986 | Billy | 370/112 |
| 4,617,658 | 10/1986 | Walters | 370/84 |
| 4,628,446 | 12/1986 | Hoffner, II | 364/200 |
| 4,658,152 | 4/1987 | Walters | 370/84 |
| 4,698,801 | 10/1987 | Hatano et al. | 370/84 |
| 4,718,062 | 1/1988 | Andersen | 370/94 |
| 4,731,785 | 3/1988 | Ferenc et al. | 370/60 |
| 4,860,283 | 8/1989 | Takano et al. | 370/84 |
| 4,864,562 | 9/1989 | Murakami et al. | 370/84 |
| 4,891,805 | 1/1990 | Fallin | 370/95.1 |

OTHER PUBLICATIONS

Annaratone et al., "Computer Architecture News" vol. 14, No. 2, Jun. 1986, pp. 346–356.
T. H. Murray, "The Evolution of DDS Networks: Part I", *Telecommunications* (Feb. 1989) pp. 39, 40, 42, 44, 46, 47.

*Primary Examiner*—Douglas W. Olms
*Assistant Examiner*—Alpus H. Hsu
*Attorney, Agent, or Firm*—David Volejnicek

[57] ABSTRACT

A subrate multiplexer (10) is implemented by means of a general-purpose microprocessor (20) that is programmed to perform subrate multiplexing functions, thereby eliminating much of the conventional special-purpose circuitry that has traditionally performed the subrate multiplexing functions as hardware functions; all that remains of the hardware is communication channel interface and timing circuitry. The multiplexer is flexible and adaptable to new transmission rates, protocols, and services, merely by being reprogrammed. The multiplexer's microprocessor can perform both substrate multiplexing and statistical multiplexing on separate logical channels, on a time-shared basis.

17 Claims, 23 Drawing Sheets

FIG. 8

CONSTANTS 520

| NAME | HEX VALUE (X=DON'T CARE) |
|---|---|
| TIME_BAUDRATE | 1000 |
| STREAM_HIGH | TIME_BAUDRATE × 60/256 |
| STREAM-LOW | TIME_BAUDRATE × 60 \ 0XFF |
| UNASSIGNED_RECEIVE | ADDRESS OF A DUMMY PORT DATA STRUCTURE |
| NOT_CMI | 4 |
| NO_LOOP | 4 |
| TIMER_ENABLE | 0X9C |
| CNT_STOP | 0X81 |
| CNT_START | 0X80 |
| CTS | 0X01 |
| STREAMING | 1 |
| MSEC50 | 50 |
| RTS_CTS | 0 |
| CMI | 0X3F |
| LOOP_DSU | 0X1A |
| KEEP_LOOP | 4 |
| LOOP_CSU | 0X0A |
| LOOP_DSU_RETURN | 0X42 |
| △ RTS | 0X20 |
| RTS | 0X08 |
| DMI | 0X7F |
| UNASSIGNED | 0X0C |
| TX_CMI | ADDRESS OF A DUMMY DUSCC RECEIVE BUFFER |
| TX_UNASSIGNED | ADDRESS OF A DUMMY DUSCC RECEIVE BUFFER |
| TX_DMI | ADDRESS OF A DUMMY DUSCC RECEIVE BUFFER |

MICROPROCESSOR-BASED SUBSTRATE MULTIPLEXER/DEMULTIPLEXER

TECHNICAL FIELD

This invention relates generally to multiplexing (including demultiplexing), and relates specifically to the subrate multiplexing of telecommunication signals.

BACKGROUND OF THE INVENTION

Multiplexing is a technique that allows a plurality of channels to be transmitted via a common channel or path. Time-division multiplexing allows the plurality of channels to share the common channel by assigning different ones of the plurality of channels to use the common channel at different times. In statistical multiplexing, the plurality of channels are connected to the common channel on a statistical basis, i.e., according to need. Typically, the signals from different ones of the plurality of channels that are successively transmitted on the common channel are separated on the common channel by idle periods of arbitrary duration. Consequently, the signals must be delimited by identifiers that indicate when the signals start and stop. Also, there is no a priori, predetermined, sequence in which the channels are connected to the common channel. Consequently, the signals from any one of the plurality of channels that are transmitted on the common channel during any time interval must include explicit addressing information that identifies either the source or the destination of those signals.

In contrast, in subrate multiplexing, the plurality of channels are connected to the common channel during adjacent successive time intervals, or slots, in a predetermined order that forms a repeating pattern of fixed duration, called a frame. Because the time slots are adjacent, i.e., not separated by idle intervals, transmissions of signals from individual ones of the plurality of channels are delimited by the beginning and end of the individual time slots and hence need no other delimiters. Also, any changes in the relative order of transmission on the common channel, such as substitution of one or more of the plurality of channels for another one or more of the plurality of channels in using one or more of the time slots of a frame, must be made known by the transmitter (the multiplexer) and to the receiver (the demultiplexer) prior to the change being effected. Consequently, the one of the plurality of channels that is the source of the signals transmitted during any time slot is identifiable from the position of those signals within the frame, and hence the signals need not include explicit addressing information.

Subrate multiplexing is well known in the art. Typically, it involves the combining through time-division techniques of a plurality of independent communication signal streams intended for transmission over a common communication channel and each one of which has a bandwidth, i.e., a transmission rate, that is lower than, i.e., that is a subrate of, the bandwidth of the common channel, into a single signal stream having the common channel's bandwidth. For example, it is common to combine the signal streams of up to 20 subchannels, each having a bandwidth of 2.4 kilobits per second (Kbps) plus associated control signals (e.g., framing information), into a single ISDN B or DS0 channel signal stream having a total bandwidth of 64 Kbps or 56 Kbps, respectively, by using a different one of each 20 successive time slots of the ISDN B or DS0 channel to carry the data signals and associated control signals of a different one of the 20 2.4 Kbps subchannels.

Subrate multiplexing is effected via devices appropriately referred to as subrate multiplexers. Subrate multiplexers have hitherto performed the multiplexing functions in hardware, i.e., via special-purpose circuits designed specifically for performing the multiplexing functions. This has made the subrate multiplexers inflexible, in that they have not been capable of adapting to different communication protocols, rates, and services or functions, without a change in their hardware, i.e., in their circuitry.

To overcome some of this inflexibility, microprocessors have been incorporated into some subrate multiplexers for the purpose of controlling the operation of the multiplexer hardware. But even then, the subrate multiplexers have continued to perform the subrate multiplexing functions via the special-purpose circuits, i.e., via hardware. The wisdom of the art is that subrate multiplexing must be done in hardware.

SUMMARY OF THE INVENTION

I have recognized that, due to the hardware nature of the arrangement that is performing the actual subrate multiplexing functions having been maintained, the flexibility achieved by the microprocessor-controlled subrate multiplexers has been limited, and what flexibility there is has been obtained at the price of higher multiplexer complexity and cost resulting from the addition of the microprocessor to the traditional special-purpose multiplexer hardware.

My invention is directed to overcoming the disadvantages of the prior art. Generally according to the invention, a subrate multiplexer is implemented by means of a programmable processor, illustratively a general-purpose microprocessor, that is programmed to perform subrate multiplexing functions, thereby eliminating the need for much of the conventional special-purpose circuitry that has traditionally performed the subrate multiplexing functions as hardware functions as opposed to programmed operations of a procesor. The elimination of much of the hardware results in elimination of much of the cost of a subrate multiplexer. Furthermore, because the processor is reprogrammable in the functions it can perform, and is not constrained merely to controlling circuitry whose functions are fixed, the processor-based subrate multiplexer is much more flexible and adaptable to new transmission rates, protocols, and services, than the prior-art subrate multiplexers.

Specifically, according to the invention, a subrate multiplexer comprises an arrangement for receiving a plurality of first signal streams each at a subrate of a transmission rate of a.second signal stream, an arrangement for transmitting the second, subrate-multiplexed, signal stream at the transmission rate of the second signal stream, and a general-purpose programmable processor that is programmed to subrate-multiplex the plurality of received first signal streams into the second signal stream. Significantly, the processor performs multiplexing in such a manner that the second signal stream comprises a plurality of adjacent frames each having an identical sequence of time slots of equal duration, with different ones of the time slots of a frame carrying signals from different ones of the first signal streams, and with sequentially identical (i.e., occupying the same relative place in the identical sequences) time slots of a plurality of the adjacent frames carrying signals from the same first signal stream. Also according to the invention, a subrate demultiplexer comprises a receiving arrangement, a transmitting arrangement, and a programmed general-purpose processor that perform the reverse functions of the transmitting arrangement, receiving arrangement, and processor, respectively, of the multiplexer.

A further advantage of the processor-based subrate multiplexer is that, in systems that already include a processor for other purposes, the subrate-multiplexing function may be had substantially for free, merely by programming the existing processor to perform the subrate-multiplexing function in addition to its other activities. For example, statistical multiplexers often include a processor, and their processors may be programmed to perform the subrate-multiplexing functions along with the statistical-multiplexing-related functions, on a time-shared basis.

These and other advantages and features of the present invention will become more apparent from the following description of an illustrative embodiment of the invention considered together with the drawing.

BRIEF DESCRIPTION OF THE DRAWING

FIG. 8 is a block diagram of the constants of the multiplexer;

DETAILED DESCRIPTION

Figure 1:
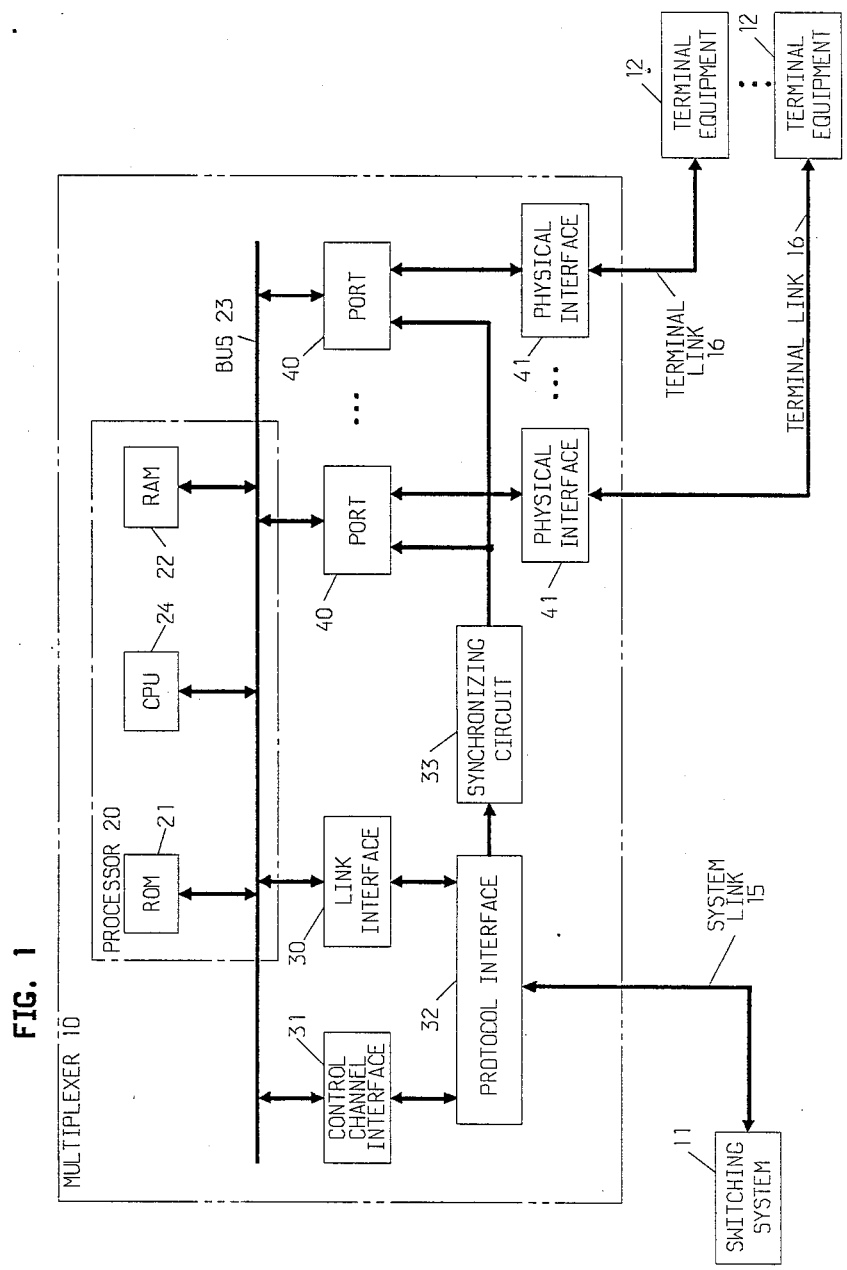
FIG. 1 is a block diagram of an illustrative embodiment of a subrate multiplexing communication system that includes the invention.

FIG. 1 shows an illustrative communication system comprising a plurality of pieces of terminal equipment 12 connected to a communication switching system 11 through a multiplexer 10. Equipment 12 is conventional, as is switching system 11. Multiplexer 10 is coupled to switching system 11 by a system link 15, and is coupled to each terminal equipment 12 by a separate terminal link 16. Multiplexer 10 receives subrate communication signal streams transmitted by terminal equipment 12 over terminal links 16, subrate-multiplexes this plurality of signal streams into a single signal stream having the full rate of a DS0 channel, and transmits the single stream across system link 15 to switching system 11. In the other direction, multiplexer 10 receives a subrate-multiplexed signal stream from switching system 11 over system link 15, subrate-demultiplexs the stream into its component signal streams, and sends different ones of the component streams to different ones of terminal equipment 12 over terminal links 16.

Communications across link 15 are conducted according to either the ISDN basic rate (BRI) protocol or the related AT&T DCP protocol. Both of these protocols provide for two 64 kbps data channels, referred to as the B channels in the ISDN protocol and as the I channels in the DCP protocol, and a control channel, referred to as the D channel in the ISDN protocol and as the S channel in the DCP protocol. The subrate-multiplexed signal stream is carried between switching system 11 and multiplexer 10 over one of the B or I channels.

Alternatively, multiplexer 10 multiplexes the signal streams received from terminal equipment 12 into two separate multiplexed-signal streams and transmits each multiplexed-signal stream over a different B or I channel of link 15. Similarly, multiplexer 10 receives two multiplexed-signal streams from switching system 11, one over each B or I channel, demultiplexes them, and sends their component streams to terminal equipment 12.

Figure 2:
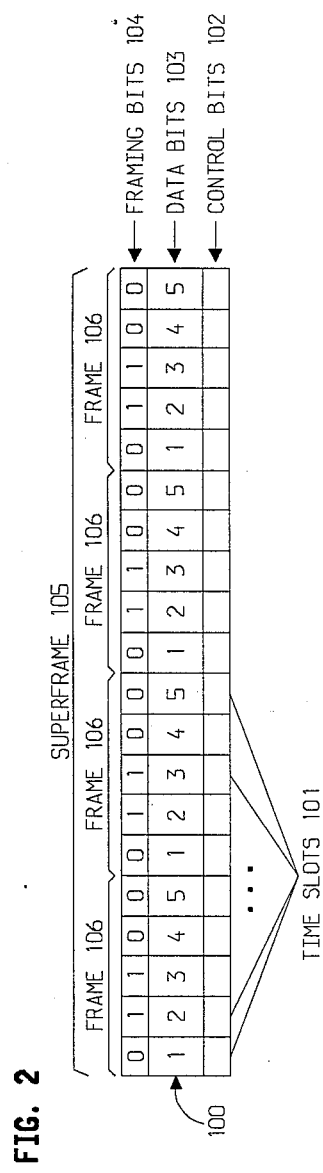
FIG. 2-4 are block diagrams of the subrate formats implemented by the multiplexer of the system of FIG. 1.
Figure 3:
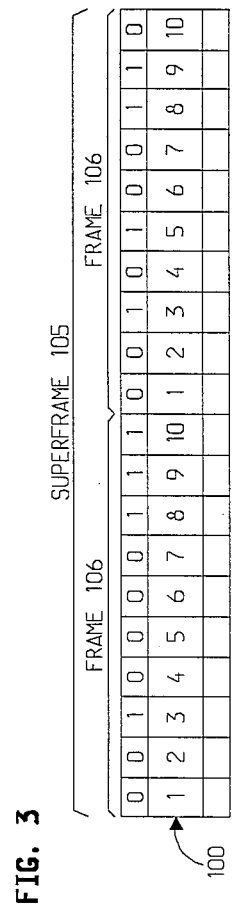
Figure 4:
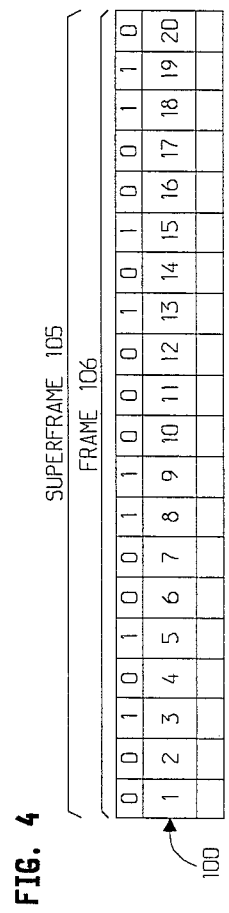

Each subrate-multiplexed B or I channel in turn defines a logical link that implements a conventional DS0 communication channel that follows the conventional SDM communication protocol. Different multiplexing formats implementable by multiplexer 10 within this context are illustrated in FIGS. 2–4. As shown in FIGS. 2–4, the 64 kbps bandwidth of a DS0 channel 100 is divided into 20 times slots 101 which form a superframe 105. Each time slot 101 carries one control bit 102, six data bits 103, and one framing bit 104, for a total of eight bits, or one byte, of information. The trasmission rate of each time slot is 2.4 kbps. Subrate channels may be subrate-multiplexed into the DS0 channel at one of five rates: 2.4 kbps, 4.8 kbps, 9.6 kbps or 19.2 kbps, or 38.4 kbps.

Subrate multiplexing at the 2.4 kbps rate is shown in FIG. 4. Each time slot 101 of superframe 105 is assigned to a different subchannel. (For example, signals carried by each time slot 101 are associated with a different terminal link 16 or port 40; see FIG. 1). Superframe 105 thus carries 20 subchannels, and comprises a single repeating pattern, or frame 106. Frame 106 is identified by the sequence of framing bits 104 shown in FIG. 4.

Subrate multiplexing at the 4.8 kbps rate is shown in FIG. 3. Each 10th time slot 101 of superframe 105 is assigned to the same subchannel, and the 20 time slots of superframe 105 are assigned to ten different subchannels in total. Superframe 105 thus includes two repeating patterns, or frames 106. Each frame 106 is identified by the sequence of framing bits 104 shown in FIG. 3.

Subrate multiplexing at the 9.6 kbps rate is shown in FIG. 2. Each 5th time slot 101 of superframe 105 is assigned to the same subchannel, and the 20 time slots of superframe 105 are assigned to five different subchannels. Superframe 105 thus includes four repeating patterns, or frames 106. Each frame 106 is identified by the sequence of framing bits 104 shown in FIG. 2.

Subrate multiplexing at the 19.2 kbps and 38.4 kbps rates uses the same framing pattern as the 9.6 kbps rate shown in FIG. 2. The 19.2 kbps rate uses two adjacent 9.6 kbps subrate channels, and the 38.4 kbps rate uses four adjacent 9.6 kbps subrate channels.

Consideration now returns to FIG. 1. According to the invention, multiplexer 10 is implemented in, i.e., the subrate-multiplexing functions are performed by, a general-purpose processor 20; the other elements of multiplexer 10 merely serve to interface links 15 and 16 to processor 20. Processor 20 includes a central processing unit (CPU) 24, such as a Motorola 68000-series microprocessor, a read-only memory (ROM) 21 that stores programs for CPU 24 including subrate-multiplexing function programs, and a randomaccess memory (RAM) 22 that is used as working storage by CPU 24, all interconnected by a communication bus 23.

Also connected to bus 23 is a link interface 30, such as the Motorola 145488 dual data link controller (DDLC), and a control channel interface 31, such as the Signetics SCN 68562 dual universal serial communication controller (DUSCC). Link interface 30 provides for transfers of multiplexed DS0 channel data signals between the B or I channels of system link 15 and RAM 22, while control channel interface 31 provides for transfers of control signals between the D or S channel of system link 15 and RAM 22.

Interfaces 30 and 31 are coupled to system link 15 by a protocol interface 32, such as the AT&T 257AK. Protocol interface 32 converts the communication format of system link 15 into format used by interfaces 30 and 31, and separates the data and control channels received on system link 15 for forwarding to the interfaces 30 and 31. Conversely, protocol interface 32 converts the communication format used by interfaces 30 and 31 into the format of system link 15, and combines the data and control channels received from interfaces 30 and 31 for transmission on system link 15. Protocol interface 32 also supplies timing signals derived from the signal stream carried by system link 15 to a synchronizing circuit 33.

Further connected to bus 23 are a plurality of communication ports 40. Each is illustratively an SCN 68562 DUSCC. Each port 40 is coupled to a terminal link 16 by a physical interface 41, such as a National Semiconductor 14c88 and 14c89. Port 40 provides for transfers of communication signals between the connected terminal link 16 and RAM 22, while physical interface 41 provides conversion between the communication format of terminal link 16 (which is illustratively an RS232 serial link) and the format used by port 40. Synchronizing circuit 33 is connected to all ports 40 and supplies to them a baud rate clock signal derived from the timing signals that it receives from protocol interface 32, so as to synchronize transmissions on links 15 and 16. Synchronizing circuit 33 is illustratively a phase-locked loop synchronizer. Such circuits are well known in the art.

Before considering the subrate multiplexing operation of processor 20 in conjunction with FIGS. 5–8, it may be helpful for a full understanding of the invention to give a general and simplified overview thereof.

All processing for both the multiplexing and demultiplexing of subrate signals is performed by a pair of interrupt service routines (tdm__transmit and tdm__receive). The different subrates of 38400, 19200, 9600, 4800, and 2400 bits per second are all supported by the entry of the appropriate information into a TDM transmit subrate framing bit pattern (tx__pattern), TDM transmit and receive port address tables (tx__tbl and rx__tbl), and an array of TDM receive subrate framing bit pattern compare values (rx__patterns). To keep from overrunning or underrunning the 4-byte port FIFOs at the 38400 and 19200 bit/second data rates, the subrate multiplexing and demultiplexing interrupt service routines are called every 500 microseconds to create, from information received from ports 40, one fifth of the 20-byte superframe to be transmitted on link 15 and to transfer one fifth of the 20-byte superframe received from link 15 to the appropriate ports 40. The routines are called five times to process the 20-byte superframes. The port interface devices (DUSCC) are programmed to a transparent synchronous mode with 6-bit characters. The 6-bit/character mode matches the 6 bits of information per byte sent and received on the link, thereby eliminating any bit shuffling other than the inclusion and removal of the subrate framing and c/s bits.

Figure 6:
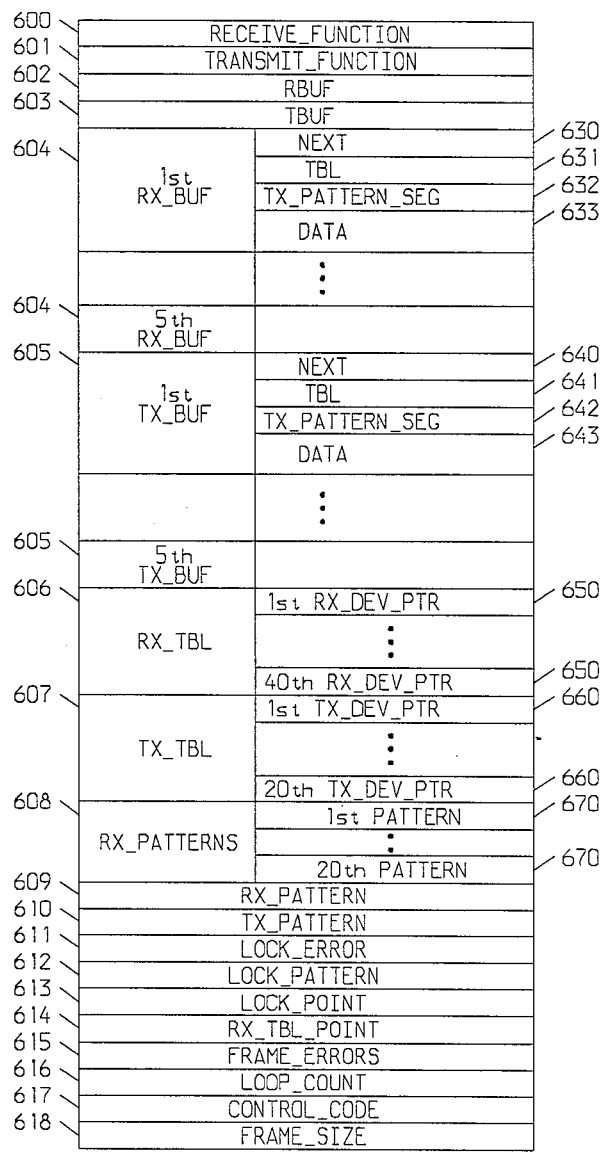
FIG. 6 is a block diagram of the contents of a TDM data structure of the multiplexer.

The link 15 subrate transmit interrupt service routine (tdm__transmit, shown in FIG. 13) first saves the processor registers that have been used so they can be restored when the interrupt service is complete, determines which link caused the interrupt, and sets up structure pointers to the appropriate port (DDLC) registers and the TDM information structure (shown in FIG. 6). The routine sets up the DDLC to transmit from the buffer pointed to by tbuf, and updates tbuf to point to the next buffer, and transfers information from ports 40 to the next link transmit buffer. The order in which the link byte information is placed in the link transmit buffer is controlled by the information in tx__tbl, a table of pointers to the port 40 receive buffers. The subrate interrupt service routine gets a pointer from the table, uses that pointer to fetch a data byte, rotates the data and appends the subrate framing and c/s bits, and puts the byte in the link transmit buffer tx__buf. This process is repeated three times, stepping through the table of pointers and the transmit buffer until the transmit buffer is full (one fifth of the 20 byte superframe). In one superframe, the subrate interrupt service routine will fetch data from 2400 baud channels once, data from 4800 baud channels twice, data from 9600 baud channels four times, data from 19200 baud channels eight times, and data from 38400 baud channels 16 times. The tx__pattern in each buffer (FIG. 6) contains the four framing bits to be appended to the transmit buffer data bytes. The port-to-subrate channel mapping is controlled by the information in tx__tbl. The tx__tbl contains the address of each port receive buffer in the order in which information is transmitted on the link.

The link 15 subrate receive interrupt service routine (tdm__receive, shown in FIGS. 14–19) first saves the processor registers that have been used to they can be restored when the interrupt service is complete, determines which link caused the interrupt, and sets up structure pointers to the appropriate DDLC registers and the TDM information structure (shown in FIG. 6). The routine sets up the DDLC to recieve from the buffer pointed to by rbuf, and updates rbuf to point to the next buffer. The information received on the link is more complex to process than the transmitted information, because the received frame may be out of phase with the start of the subrate interrupt service routine, thus causing two partial super frames to be stored in the receive buffers rx__buf. The received 20-byte superframe may consist of the end of one superframe followed by the beginning of another. The subrate framing pattern is recovered from the received frame, and the received frame is aligned, using the recovered framing bits, with a pointer into rx__tbl. Four bits of the framing patterns are recovered by each interrupt, and the frame is aligned every five interrupts or every 20 framing bits.

The TDM receive interrupt service routine must also process inband DDS control codes, for which it requires several state variable to be maintained on a per-port basis. For this reason, rx_tbl contains pointers to a TDM information structure (see FIG. 7) instead of device pointers like tx_tbl. Information, in the order received, is either used to update the state variables in the structure pointed to by the pointer in rx_tbl, or transferred to the appropriate data port.

Each received byte is passed through both port and composite loopback state sequences. If the composite loopback state sequence determines that the link state has changed to the composite loopback state, the state of each port is saved for later restoration, the port interrupts are disabled, the port EIA leads are made inactive, and the link transmit and receive interrupt vectors are set to point to link_tx_loopback and link_rx_comp_loop routines.

In one superframe 105, the subrate receive interrupt service routine sends data to 2400 baud channels once, data to 4800 baud channels twice, data to 9600 baud channels four times, data to 19200 baud channels eight times, and data to 38400 baud channels sixteen times. In order to prevent overrun of the 4-byte port FIFOs, the routine is called every one-fifth of a superframe.

Figure 5:
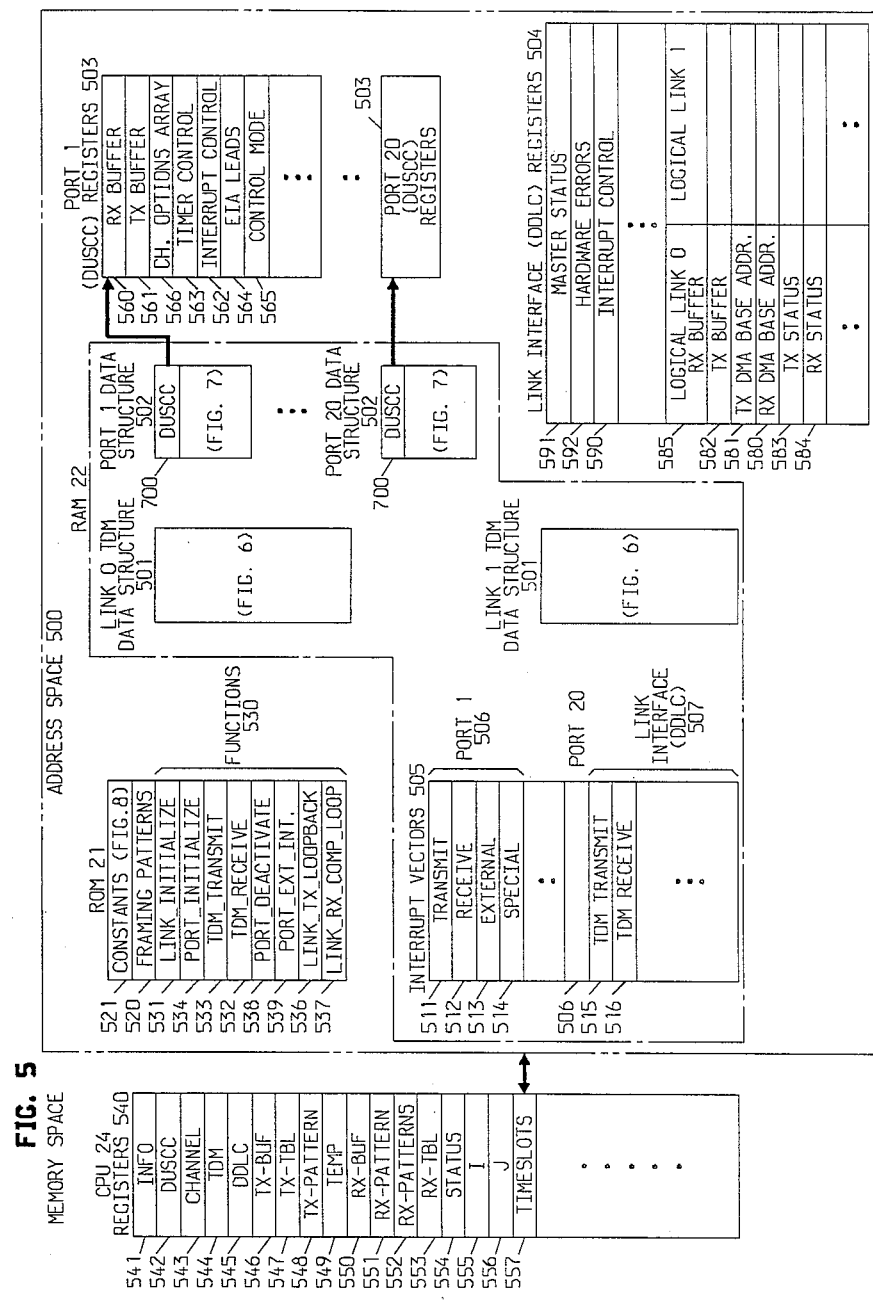
FIG. 5 is a block diagram of the memory space layout of the multiplexer.

Turning now to the details of the implementation of multiplexer 10, attention is first directed to FIG. 5, which shows the memory space of multiplexer 10. The memory space includes a plurality of CPU 24 registers 540, and an address space 500 into which are mapped ROM 21, RAM 22, registers 503 of each port 40, and registers 504 of link interface 30.

ROM 21 stores a plurality of multiplexing-related functions 530, multiplexing-related constants 521, and the three framing patterns 520 shown in FIGS. 2–4. Constants 521 are shown in FIG. 8 while functions 530 are shown in FIGS. 9–25.

RAM 22 stores a plurality of multiplexing-related interrupt vectors 505. Among interrupt vectors 505, each port 40 has its own set 506 of four interrupt vectors: a transmit interrupt vector 511, a receive interrupt vector 512, an external interrupt vector 513, and a special interrupt vector 514. Vectors 505 also include a set 507 of 16 interrupt vectors for link interface 30, including a TDM transmit vector 515 and a TDM receive vector 516. RAM 22 also stores two TDM data structures 501, one for each logical link, i.e., B or I channel, defined by system link 15. TDM data structures 501 are illustrated in detail in FIG. 6. RAM 22 further stores a plurality of port data structures 502, one for each port 40. Each port data structure 502 includes an entry DUSCC 700 each port 40. Each port data structure 502 includes an entry DUSCC 700 is a pointer within address space 500 to port registers 503 of the associated port 40. Port data structures 502 are illustrated in detail in FIG. 7.

Turning to FIG. 6, a link TDM data structure 501 includes a plurality of entries 600 et seq. Entry receive_function 600 is a pointer into RAM 22 to TDM receive vector 516 that points to TDM receive function 532. Entry transmit_function 601 is a pointer into RAM 22 to TDM transmit vector 515 that points to TDM transmit function 533. Entry rbuf 602 is a pointer into structure 501 to the presently-used link interface 30 receive buffer rx_buf 604. Entry tbuf 603 is a pointer into structure 501 to the presently-used link interface 30 transmit buffer tx_buf 605. Each entry 604 includes an entry next 630 which points into structure 501 to the next rx_buf 604 to be used, an entry tbl 631 which points into structure 501 to one of the tx_dev_ptr entries 650 of entry tx_tbl 606, an entry data 633 which is a 4-byte block of storage for received data, and an entry tx_pattern_seg 632 which contains that portion—a segment—of entry tx_pattern 610 that applies to data 633.

Similarly to rx_buf 604, each entry tx_buf 605 includes an entry next 640 which points into structure 501 to the next tx_buf 605 to be used, an entry tbl 641 that points into structure 501 to one of the tx_dev_ptr entries 660 of entry tx_tbl 607, an entry data 643 which is a 4-byte block of storage for transmit data, and an entry tx_pattern_seg 642 which contains that portion—a segment—of entry tx_pattern 610 that applies to data 643.

Entry rx_tbl 606 is a table of forty pointers rx_dev_ptr 650, each one of which identifies a port 40 as an intended recipient of signals. Each port 40 is identified by more than one pointer 650. A pointer 650 addresses port data structure 502 of the identified port 40. Entry tx_tbl 607 is a table of twenty pointers tx_dev_ptr 660, each one of which identifies a port 40 as an intended source of signals. Each port 40 may be identified by more than one pointer 660. A pointer 660 addresses the receive-buffer registers 560 of the identified port 40.

Entry tx_pattern 610 is the one of the superframe 105 framing bit patterns 520 (i.e., that of FIG. 2, 3, or 4) that is to be transmitted.

Entry rx_patterns 608 is a table of twenty possible superframe 105 framing bit patters 670 that may be received on system link 15. In use, these patterns are compared with the received pattern to identify the received pattern. Each pattern 670 is the same pattern 520 (i.e., that of FIG. 2, 3, or 4) in reverse order and rotated by one bit with respect to the preceding pattern 520. Entry rx_pattern 609 is the recovered received pattern 670 that is actually received.

Entry lock_error 611 indicates whether the received framing bit pattern has been matched with any one of the patterns 670. Entry lock_pattern 612 stores the last valid, i.e., matched, received framing bit pattern. After receipt over system link 15 of the first superframe 105, it should be identical to rx_pattern 609. Entry frame_errors 615 is a frame error counter that counts the number of times the received framing bit pattern has not been matched to a pattern 670.

Entry lock_point 613 is a pointer into rx_tbl 606 of structure 501 to the rx_dev_ptr 650 which identifies the first recipient port 40 corresponding to the locked framing pattern in lock_pattern 612. Entry rx_tbl_point 614 is a pointer into rx_tbl 606 of structure 501 to the rx_dev_ptr 650 which identifies the first recipient port 40 corresponding to the last received framing pattern.

Entry loop_count 616 is a counter used for processing composite loopback state sequences. Entry control_code 617 stores any control code received by multiplexer 10 from switching system 11. Entry frame_size 618 indicates the size, i.e., length measured in the number of time slots 101, of a frame 106.

Figure 7:
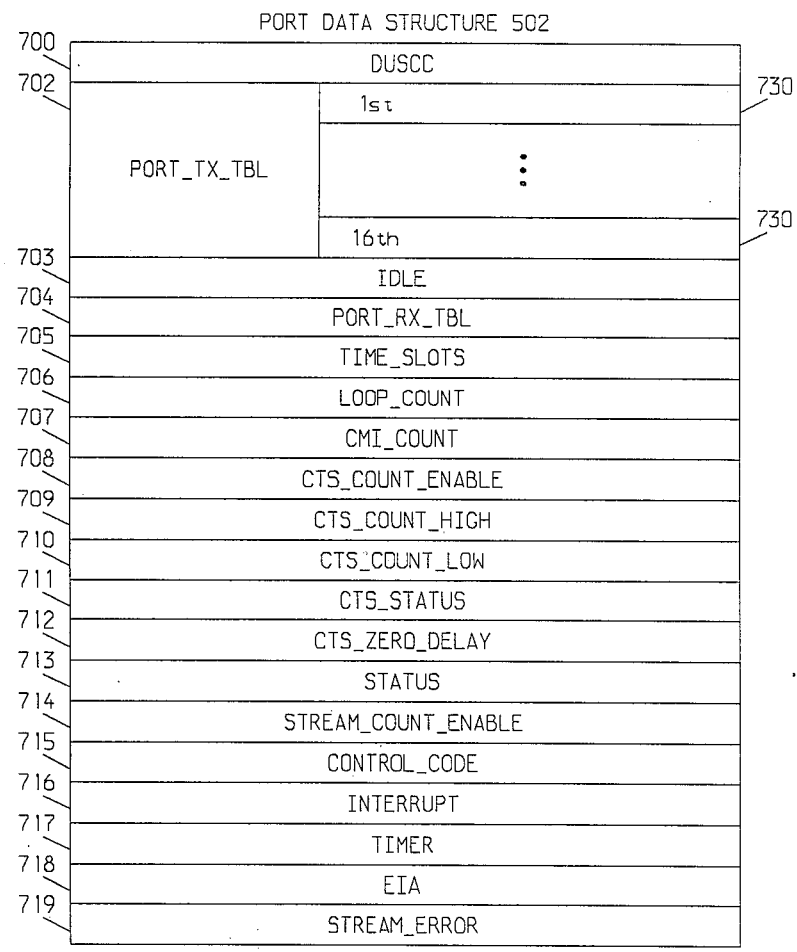
FIG. 7 is a block diagram of the contents of a port data structure of the multiplexer.

Turning to FIG. 7, a port data structure 502 includes a plurality of entries 700 et seq. Entry DUSCC 700 is a pointer in address space 500 to registers 503 of the structure's associated port 40.

Entry port_tx_tbl 702 is a table of 16 pointers 730 into structure 501 to entries 660 of tx_tbl 607. Entry idle 703 is a pointer into ROM 21 constants 520 to an idle character, either a CMI or a DMI. Entry port_rx_tbl 704 is a pointer into structure 501 to entry rx_tbl 606. Entry time_slots 705 is a bit map of which time slots 101 of a superframe 105 are assigned to the associated port 40. Entry loop_count 706 is a counter used for processing port loopback state sequences. Entry cmi_count 707 is a counter used for processing control mode idle state sequences.

Entry cts_count_enable 708 indicates whether timer interrupts are enabled for RTS-CTS (RS232 request to send—clear to send) delay or streaming (stuck in transmit mode) terminal detection. Entries cts_count_high 709 and cts_count_low 710 are the high and low bytes of the delay in milliseconds for the RTS-CTS delay that triggers an interrupt if the delay is set at more than 0, and indicates the streaming terminal timeout delay that triggers an interrupt if the RTS-CTS delay is set at 0. Entry cts_status 711 indicates whether RTS-CTS delay or streaming terminal detection triggers an interrupt. Entry cts_zero_delay 712 indicates whether RTS-CTS delay is set at 0. Entry status 713 indicates the presently-executing timed function, RTS-CTS or streaming terminal timeout. Entry stream_count_enable 714 indicates whether interrupts are enabled for streaming terminal detection. Entry stream_error 719 indicates whether a streaming terminal has been detected.

Entry control_code 715 stores any control code received by multiplexer 10 from switching system 11 for the associated port 40. Entry interrupt 716 temporarily stores a bit map of interrupt control register 562 of the associated port 40 while in loopback mode. Entry timer 717 temporarily stores the value of timer control register 563 of the associated port 40 while in loopback mode. Entry eia 718 temporarily stores the values of EIA 564 leads of the associated port 40 while in loopback mode.

Figure 9:
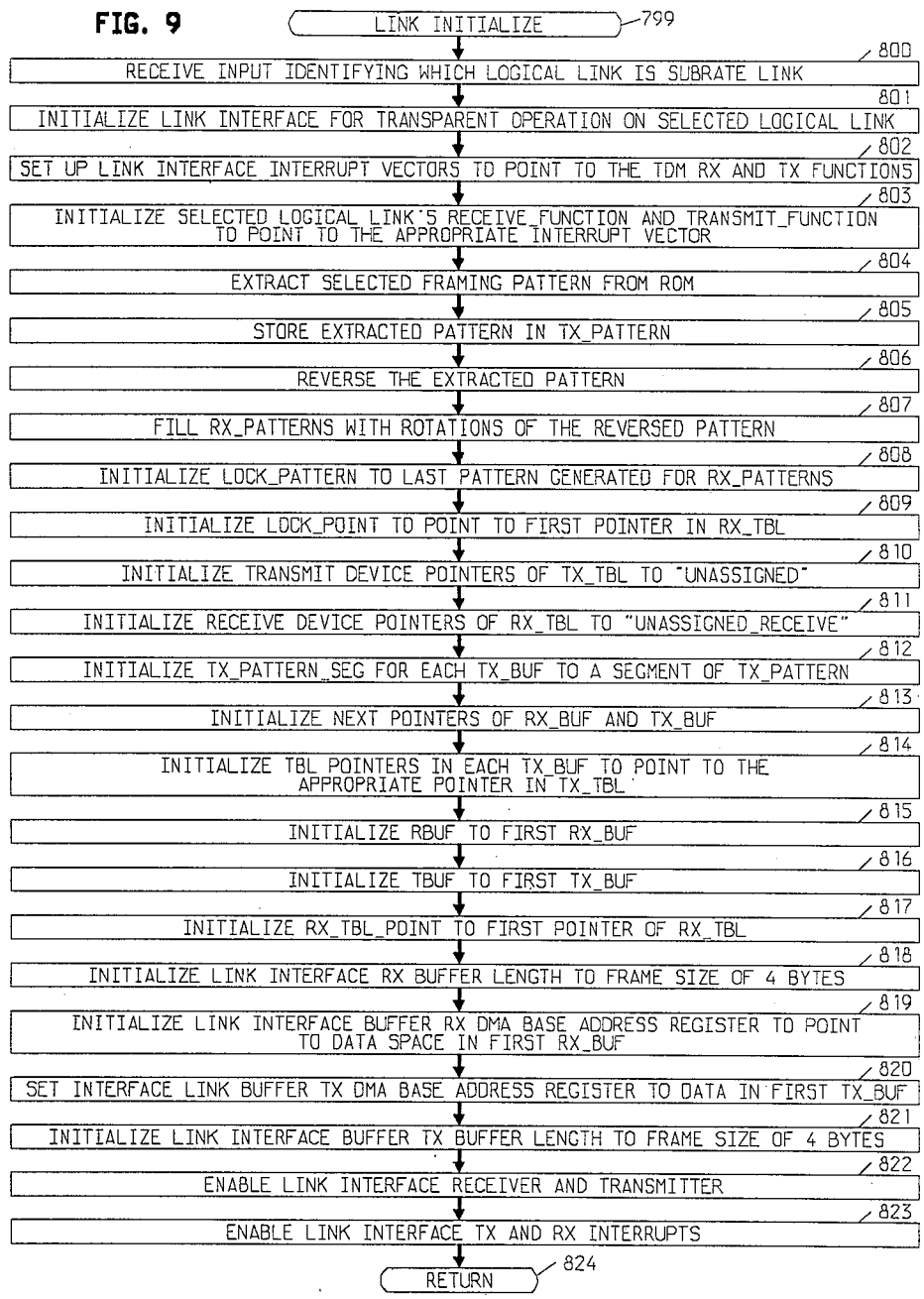
FIG. 9 is a flow diagram of the link initialize function of the multiplexer.

Turning to FIG. 9, it diagrams link_initialize function 531 (see FIG. 5), which activates a subrate-multiplexed logical link on system link 15. Upon being invoked at step 799, by receipt at multiplexer 10 of a control code from switching system 11, function 531 receives input that is provided by switching system 11 along with the control code, identifying which B or I channel of system link 15 is to serve as the subrate-multiplexed logical link, at step 800. Based on this input, function 531 initializes link interface 30 for transparent operation on that B or I channel, at step 801. Transparent operation is one of the two conventional operating modes of the DDLC of link interface 30. In this mode, the DDLC performs no bit insertion into the transmitted stream. Function 531 then initializes TDM receive interrupt vector 516 and TDM transmit interrupt vector 515 of link interface 30 interrupt vectors 507 to point to TDM receive and TDM transmit functions 532 and 533, respectively, in ROM 21, at step 802. Function then initializes receive_function 600 and transmit_function 601 in TDM data structure 501 of the logical link specified at step 801, to point to vectors 515 and 516, respectively, at step 803. Function 531 then extracts from ROM 21 the one of the transmit framing patterns 520 specified by information received at step 801, at step 804, and stores the extracted pattern in tx_pattern 610 iif the selected logical link's TDM data structure 501, at step 805. Function 531 then reverses the extracted pattern, at step 806, thereby forming a receive pattern, and uses this pattern to fill rx_patterns 608 of TDM data structure 501, at step 807. Function 531 fills each entry 670 of rx_patterns 608 with the reversed pattern rotated by one bit relative to the preceding entry 670. Function 531 then initializes lock_pattern 612 to the contents of the last entry 670 of rx_patterns 608, at step 808. Function also initializes lock_point 613 to point to the first entry 650 of rx_tbl 606, at step 809. At step 810, function 531 initializes entries 660 of tx_tbl 607 to point to UNASSIGNED 222, a constant (see FIG. 8) that represents a dummy transmit channel, i.e., one not assigned to a port 40. At step 811, function 531 initializes entries 650 of rx_tbl 606 to point to UNASSIGNED_RECEIVE 201, a constant that denotes the address of a dummy port data structure that contains a pointer to a dummy DUSCC. At step 812, function 531 initializes tx_pattern_seg 642 of each tx_buf 605 with a 4-bit segment of tx_pattern 610. Entry 642 of first tx_buf 605 gets the first segment, entry 642 of second tx_buf 605 gets the second segment, and so on. At step 813, function 531 initializes next pointers 640 of entries rx_buf 604 each to point to the next rx_buf 604. The next pointer 640 of the fifth rx_buf 604 is set to point to the first rx_buf 604. At step 813, function 531 initializes next pointers 650 of entries tx_buf 605 analogously. At step 814, function 531 initializes tbl pointers 641 of entries tx_buf 605 to point to appropriate entries 660 of tx_tbl 607. Pointer 641 of the first tx_buf 605 is set to point to the first entry 660 of tx_tbl 607, pointer 641 of the second tx_buf 605 is set to point to the fifth entry 660 of tx_tbl 607, pointer 641 of the third tx_buf 605 is set to point to the 9th entry 660 of tx_tbl 607, pointer 641 of the fourth tx_buf 605 is set to point to the 13th entry 660 of tx_tbl 607 and pointer 641 of fifth tx_buf 605 is set to point to the 17th entry of 660 of tx_tbl 607. At step 815, function 531 initializes rbuf 602 to point to the first rx_buf 604, and at step 816, function 531 initializes tbuf 603 to point to the first tx_buf 605. At step 817, function 531 initializes rx_tbl_point 614 to point to the first entry 650 of rx_tbl 606. At step 818, function 531 initializes the receive buffer registers of link interface 30 to a frame size of 4 bytes. At step 819, function 531 initializes receive DMA base address register 580 of the appropriate logical link of link interface 30 to point to the beginning of data entry 633 of the first rx_buf 604. At step 820, function 531 initializes transmit DMA base address register 581 of the appropriate logical link of link interface 30 to the beginning of data entry 643 of the first tx_buf 605. At step 821, function 531 initializes the transmit buffer registers 582 of the appropriate logical link of link interface 30 to a frame size of 4 bytes. Function 531 then enables the transmitter and receiver of link interface 530, at step 822, and enables link interface 30 transmit and receive interrupts in link interface 30 interrupt control register 590, at step 823. Initialization is thereby completed, and function 531 returns to the point at which it was called, at step 824.

Figure 10:
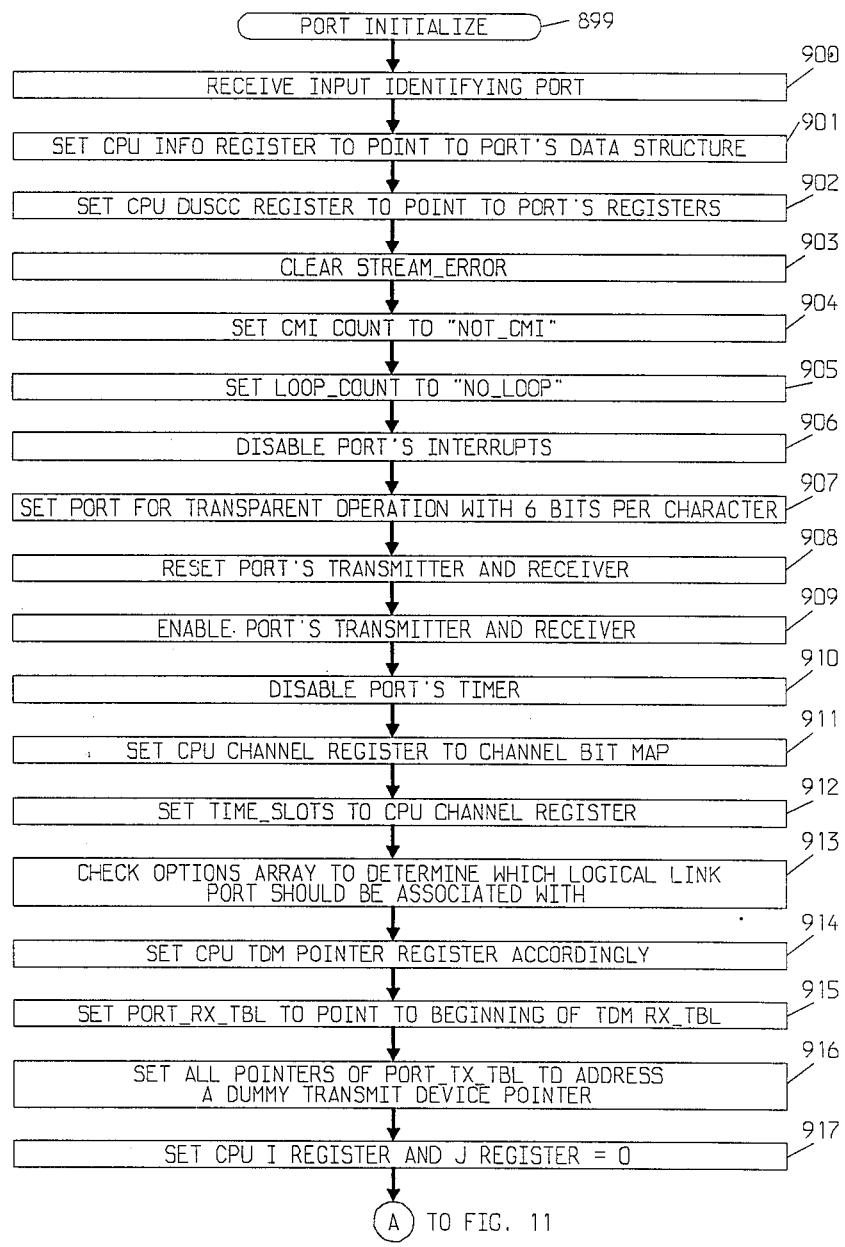
FIGS. 10–12 are a flow diagram of the port initialize function of the multiplexer.
Figure 11:
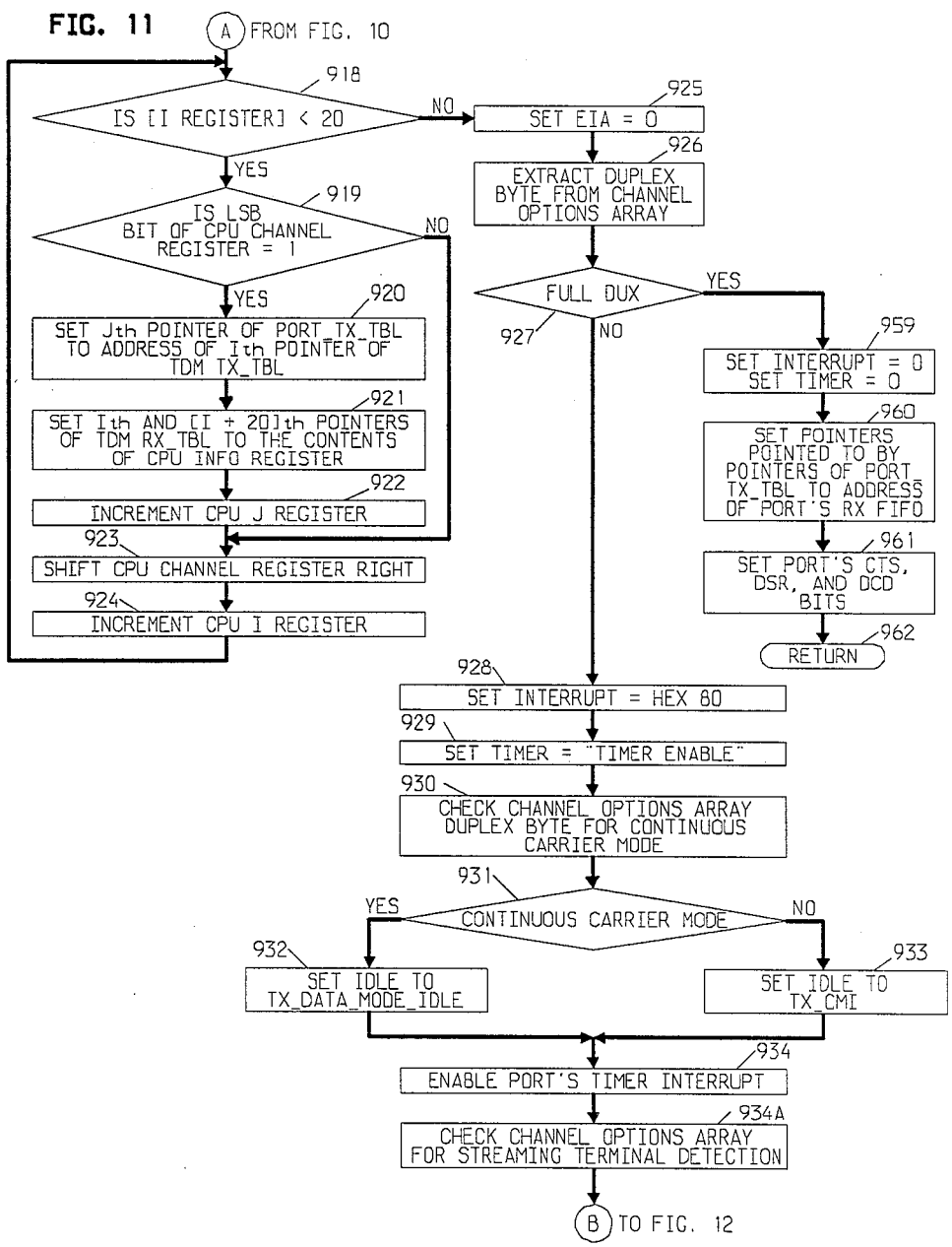
Figure 12:
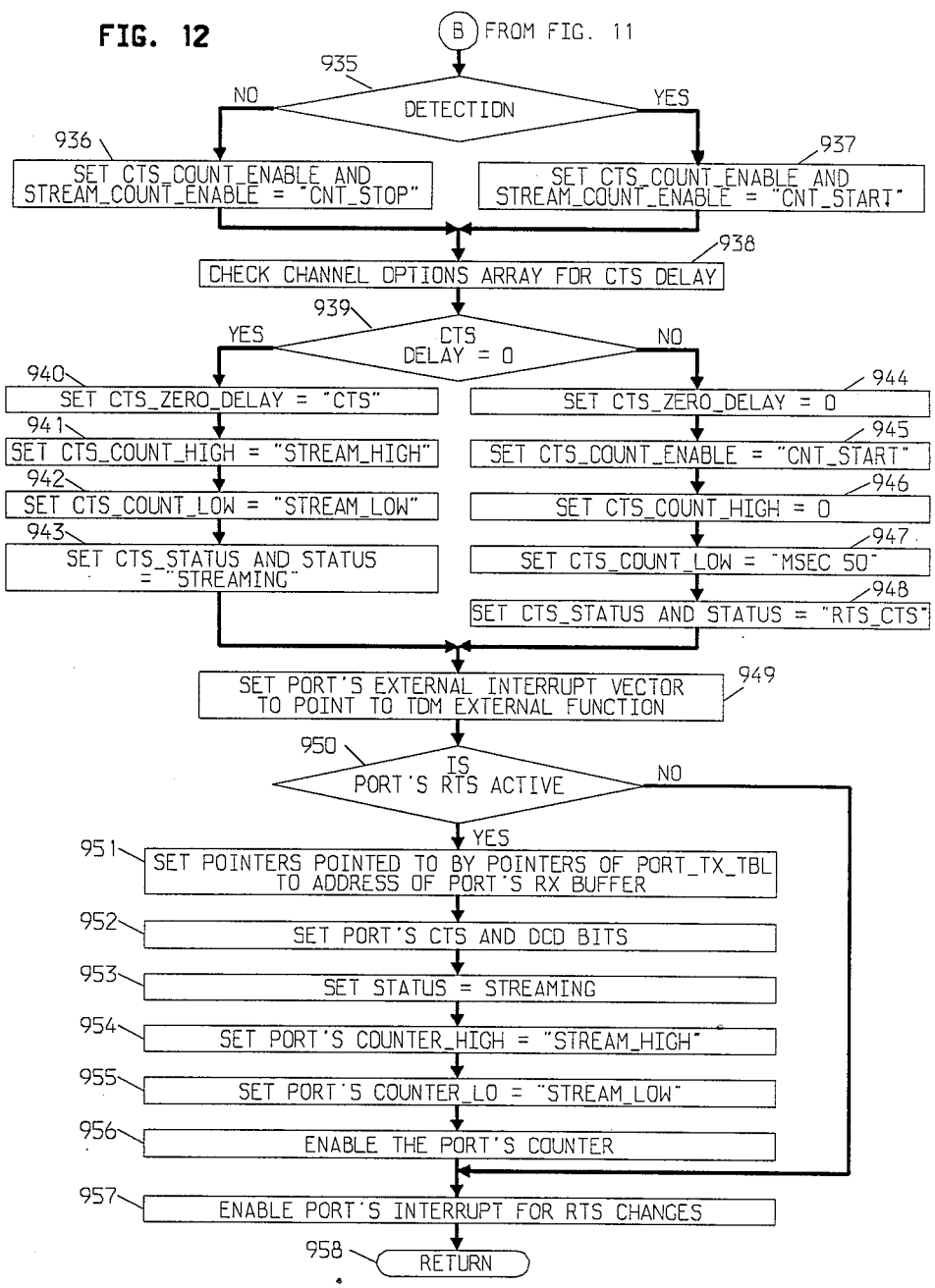

FIGS. 10-12 show port initialization function 534. Function 534 is executed each time multiplexer 10 receives a control code from switching system 11 via control channel interface 31 commanding multiplexer 10 to set up a designated port 40 to transmit and receive on a specified subchannel of the subrate-multiplexed system link 15. In response to its invocation at step 899, function 534 receives the number of the port 40 which switching system 11 selected for initialization, at step 900. On the basis of the received port 40 number, function 534 creates a pointer to the selected port's data structure 502 in Info register 541 of CPU 24, at step 901. Subsequent references herein to port data structure 502 entries are to this selected port's data structure 502. At step 902, function 534 sets DUSCC register 542 of CPU 24 to point to the selected port's physical registers 503. At step 903, function 534 clears stream-error 719. At step 904, function 534 sets cmi_count 707 to NOT_CMI 202, a constant. At step 905, function 534 sets loop_count 616 to NO_LOOP 203, another constant. At step 906, function 534 disables the interrupts of the selected port 40, by making requisite changes to the contents of the selected port's interrupt control register 562. At step 907, function 534 sets the selected port 40 for transparent operation with 6 bits per character, in a conventional manner, again by manipulating the port's register 565 contents. At step 908, function 534 resets the selected port's transmitter and receiver, and then enables them, at step 909. At step 910, function 534 disables the selected port's timer. At step 911, function 534 sets a Channel register 543 of CPU 24 to the selected channel's bit map. The bit map is an indication of which time slots in a frame 106 are assigned to this channel. Function 534 obtains this information from the port's channel options array register 566. The contents of register 566 will have been programmed by switching system 11 via the D or S control channel and multiplexer 10 control channel interface 31. At step 912, function 534 initializes time_slots 705 to the contents of CPU 24 Channel register 543. At step 913, function 534 checks options array register 566 of the selected port 40 to determine which one of the two possible logical links, i.e., B or I channels, of system link 15 the port should be associated with, i.e., which logical link will carry that port's communications. At step 914, function 534 sets CPU 24 Tdm register 544 to point to that logical link's TDM data structure 501. At step 915, function 534 initializes rx_tbl 704 to point to the beginning of rx_tbl 606 of the TDM data structure 501 pointed to by CPU 24 Tdm register 544. At step 916, function 534 sets all entries 730 of port_tx_tbl 701 to point to a pointer that points to a dummy transmit device with the constant value UNASSIGNED 222. At step 917, function 534 initializes CPU 24 I register 555 and J register 556 to 0. At step 918, function 534 checks whether the contents of I register 555 are less than 20. If so, function 534 checks whether bit 0, the least-significant bit, of Channel register 543 is set to one, at step 919. If so, function 534 sets the Jth (where J is the contents of J register 556) entry of port_tx_tbl 702 to point to the Ith (where I is the contents of I register 555) entry 660 of tx_t-bl_607 of the associated link's TDM data structure 501, at step 920. At step 921, function 534 sets the Ith and (I+20)th entry 650 of rx_tbl 606 of the TDM data structure 501 to the contents of CPU 24 Info register 541. Function 534 then increments the contents of J register 556 by one, at step 922.

Following step 922, or if it has been determined at step 919 that the least significant bit of Channel register 543 is not set to one, function 534 shifts the contents of Channel register 543 right by one, at step 923, and increments the contents of I register 555 by one, at step 924. Function 534 then returns to step 918.

When it is determined at step 918 that the contents of I register 555 are not less than 20, function 534 proceeds to step 925 and sets eia 719 to zero. At step 926, function 534 accesses channel option array register 566 of the selected port 40 and extracts therefrom the duplex byte, which indicates whether port 40 is to operate in half-duplex or full-duplex mode. If full-duplex operation is indicated, as determined at step 927, function 534 sets interrupt 716 to zero, thereby disabling port interrupts, and also sets timer 717 to zero, at step 959. Function 534 then sets the transmit device pointers that are pointed to by entries 730 of port_tx_tbl 702 to the address of receive buffer registers 560 of the selected port 40, at step 960. Function 534 then also sets the CTS, DSR, and DCD bits within EIA leads registers 564 of the selected port 40, at step 961. Port initialization is completed thereby, and function 534 returns to the point of its invocation, at step 962.

Returning to step 927, if half-duplex operation is indicated, function 534 sets interrupt 716 to a hex value of 80, thereby enabling port interrupts, at step 928. At step 929, function 534 sets timer 717 to TIMER-ENABLE 205, a constant (see FIG. 8). At step 930, function 534 refers to the selected port's channel options array register 566 duplex byte to determine whether continuous carrier mode is called for. If so, as determined at step 931, at step 932 function 534 sets idle 703 to the value of TX_DMI 226, a constant that is an address of a dummy DUSCC receive buffer that contains the value DMI 221; if not, at step 933 function 534 sets idle 703 to the value of TX_CMI 224, another constant that is an address of a dummy DUSCC receive buffer that contains the value of CMI 214. Following step 932 or 933, function 534 enables timer interrupts of the selected port 40, at step 934, by making requisite changes to the contents of that port's interrupt control register 562. At step 934A, function 534 again checks the selected port's channel options array register 566, this time to determine whether streaming terminal detection is called for. If not, as determined at step 935, function 534 sets cts_count_enable 708 and stream_count_enable 714 to the value of CNT_STOP 206, a constant, at step 936; if true, function 534 sets cts_count_enable 708 and stream_count_enable 714 to the value of CNT_START 207, another constant, at step 937.

Following step 936 or 937, function 534 again checks the selected port's channel options array register 566, this time to determine whether CTS delay is set to zero, at step 938. If so, as determined at step 939, function 534 sets zero_delay 712 to the value of CTS 208, a constant, at step 940; sets cts_count_high 709 to the value of STREAM_HIGH 209, another constant, at step 941; sets cts_count_low 710 to the value of STREAM_LOW 210, also a constant, at step 942; and sets cts_status 711 and status 713 to the value of STREAMING 211, likewise a constant, at step 943. Returning to step 939, if CTS delay is not set to zero, function 534 sets the value of cts_zero_delay 712 to 0, at step 944; sets cts_count_enable 708 to the value of CNT_START 207, at step 945; sets the value cts_count_high 709 to zero, at step 946; sets cts_count_low 710 to the value of MSEC50 212, another constant at step 947; and sets cts_status 713 to the value of RTS_CTS 213, another constant in, at step 948.

Following step 943 or 948, function 534 sets external interrupt vector 513 of the selected port 40 in RAM 22 interrupt vectors 505 to point to port_ext_int function 539 in routines 530, at step 949. Function 534 then determines, from register 564 of the selected port 40, whether the port's RTS signal is active, at step 950. If so, function 534 sets the transmit device pointers that are pointed to by entries 730 of port_tx_tbl 702 to the address of receive buffer registers 503 of the selected port 40, at step 951. Function 534 then also sets the CTS and DCD bits within register 564 of the selected port 40, at step 952; sets status 713 to STREAMING 211, at step 953; sets the counter_high count in the selected port's registers 563 to STREAM_HIGH 209, at step 954; sets the counter_lo count in the selected port's register 563 to STREAM_LOW 210, at step 955; and finally enables the timer of the selected port 40, at step 956.

Following step 956, or if it is determined at step 950 that the selected port's RTS signal is not active, function 534 enables interrupts of the selected port 40 for changes in the RTS status, at step 957, by making requisite changes to the contents of the port's interrupt control register 562. Port initialization is completed thereby, and function 534 returns to the point of its activation, at step 958.

Figure 13:
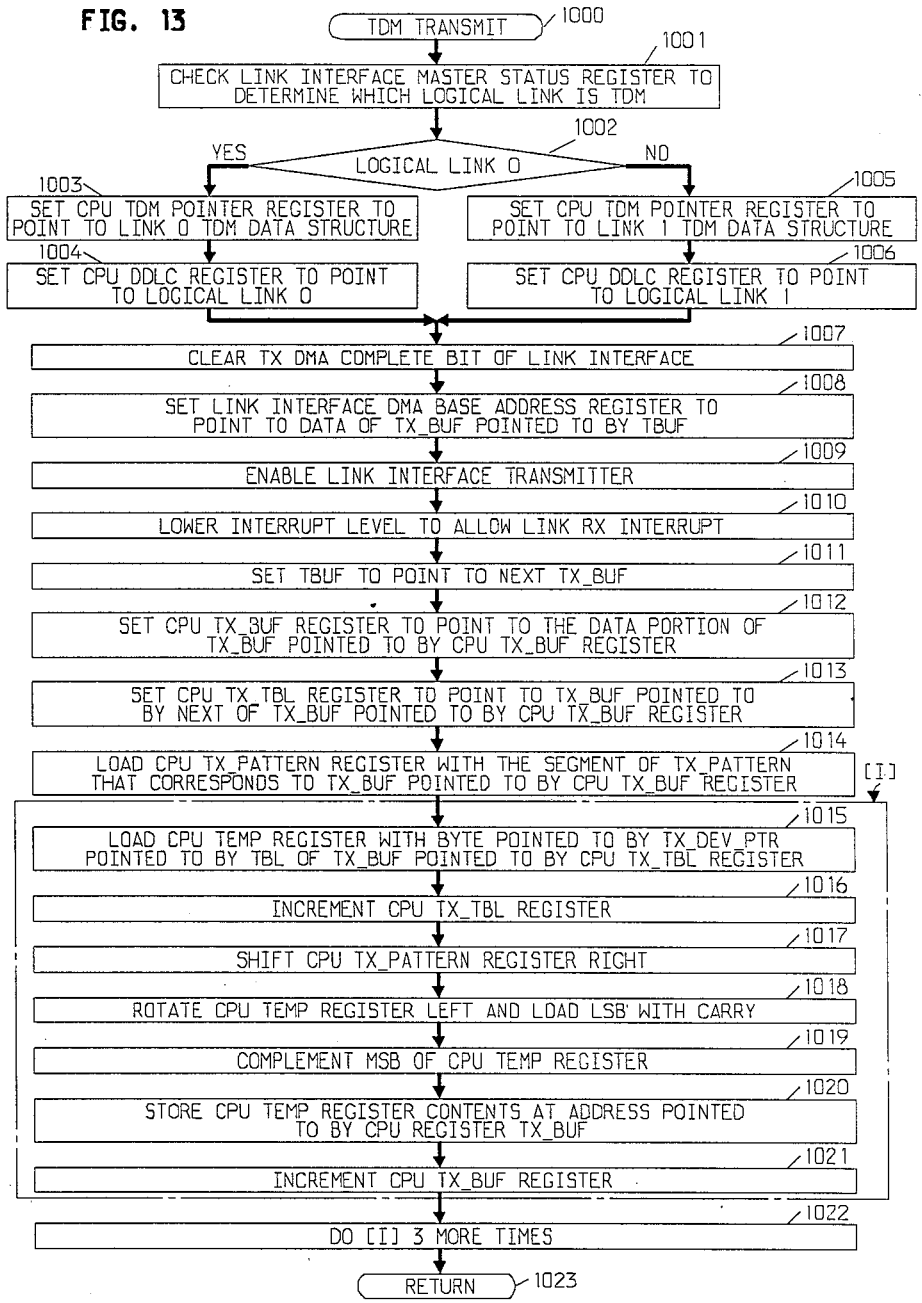
FIG. 13 is a flow diagram of the TDM transmit function of the multiplexer.
Figure 14:
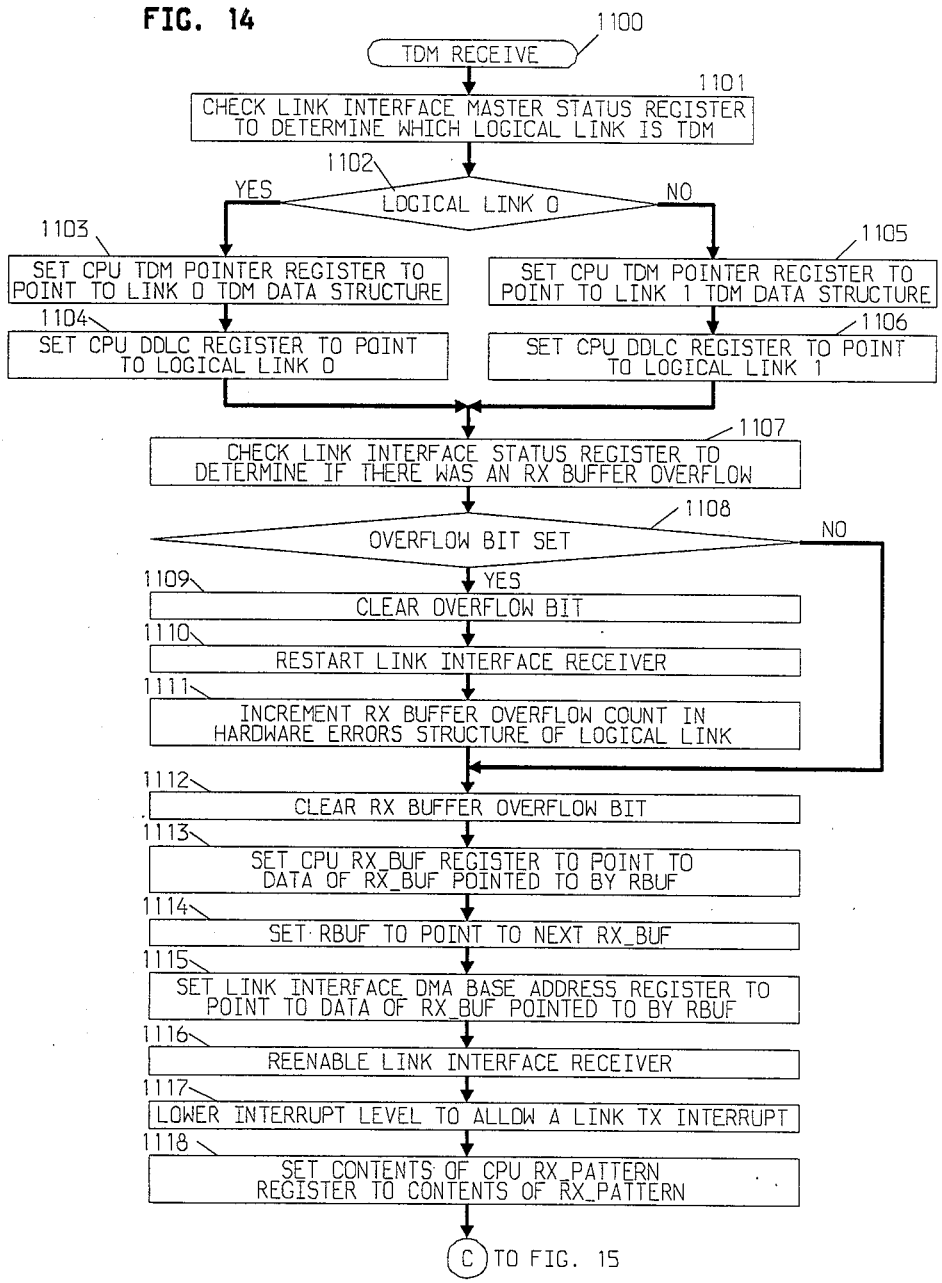
FIGS. 14–19 are a flow diagram of the TDM receive function of the multiplexer.
Figure 15:
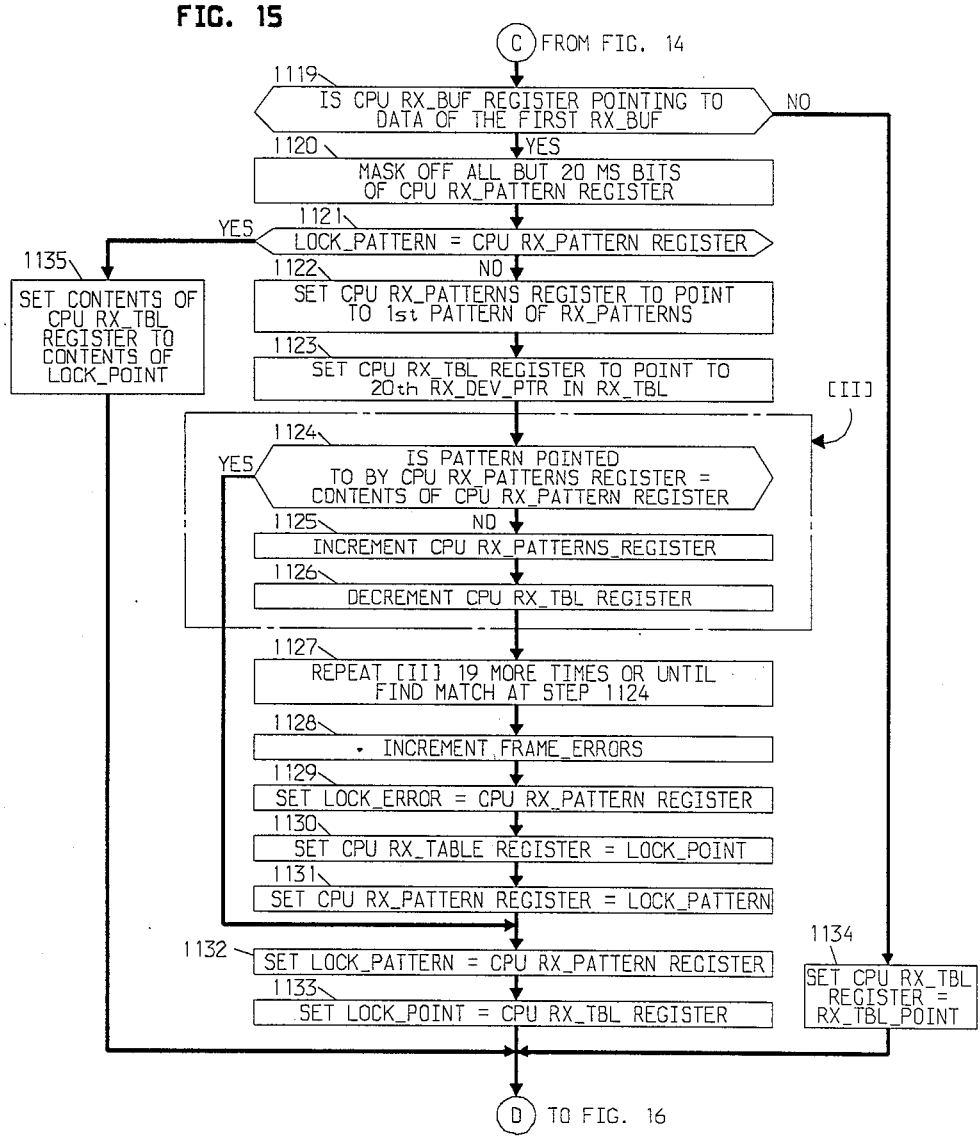
Figure 16:
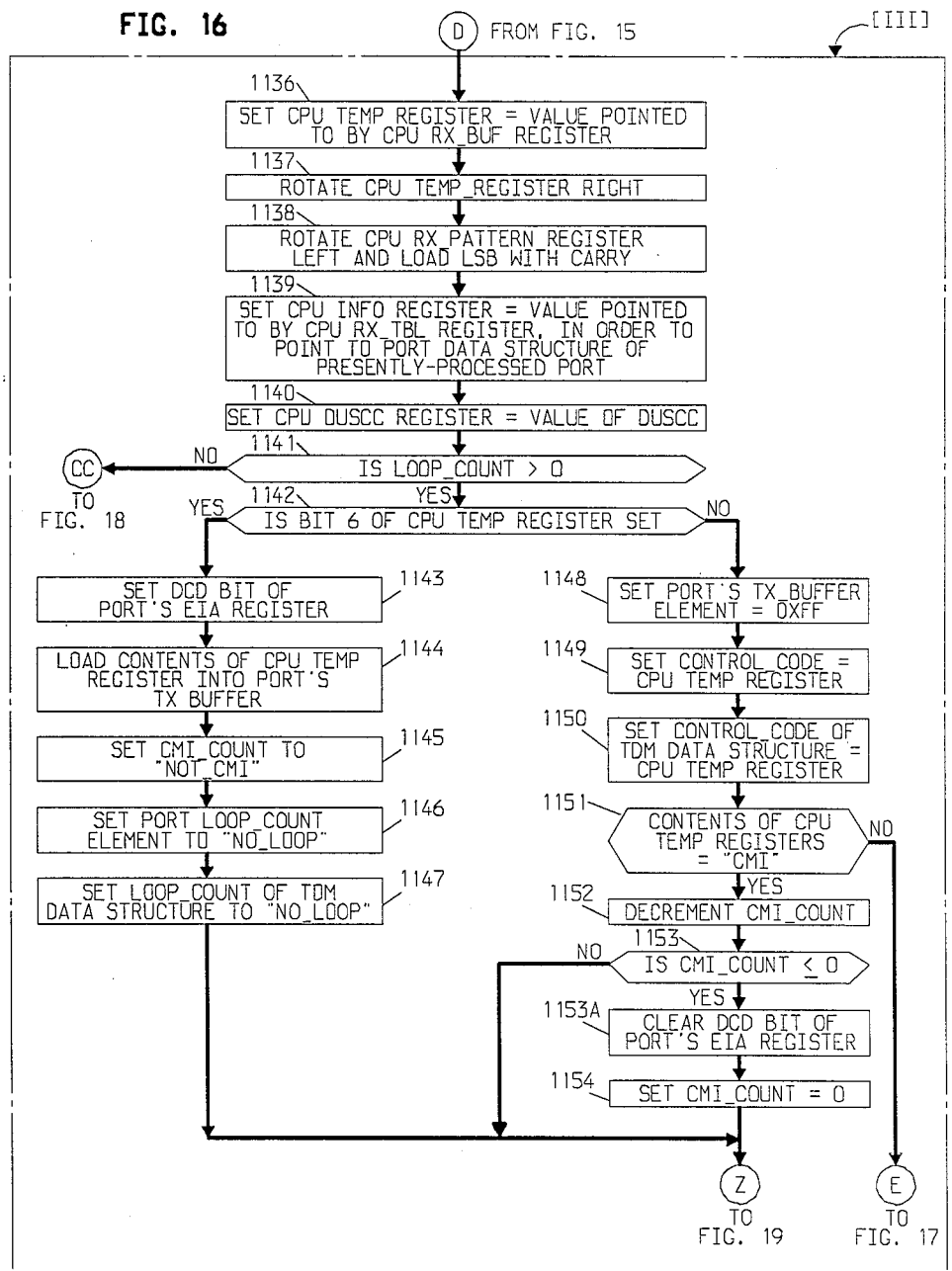
Figure 17:
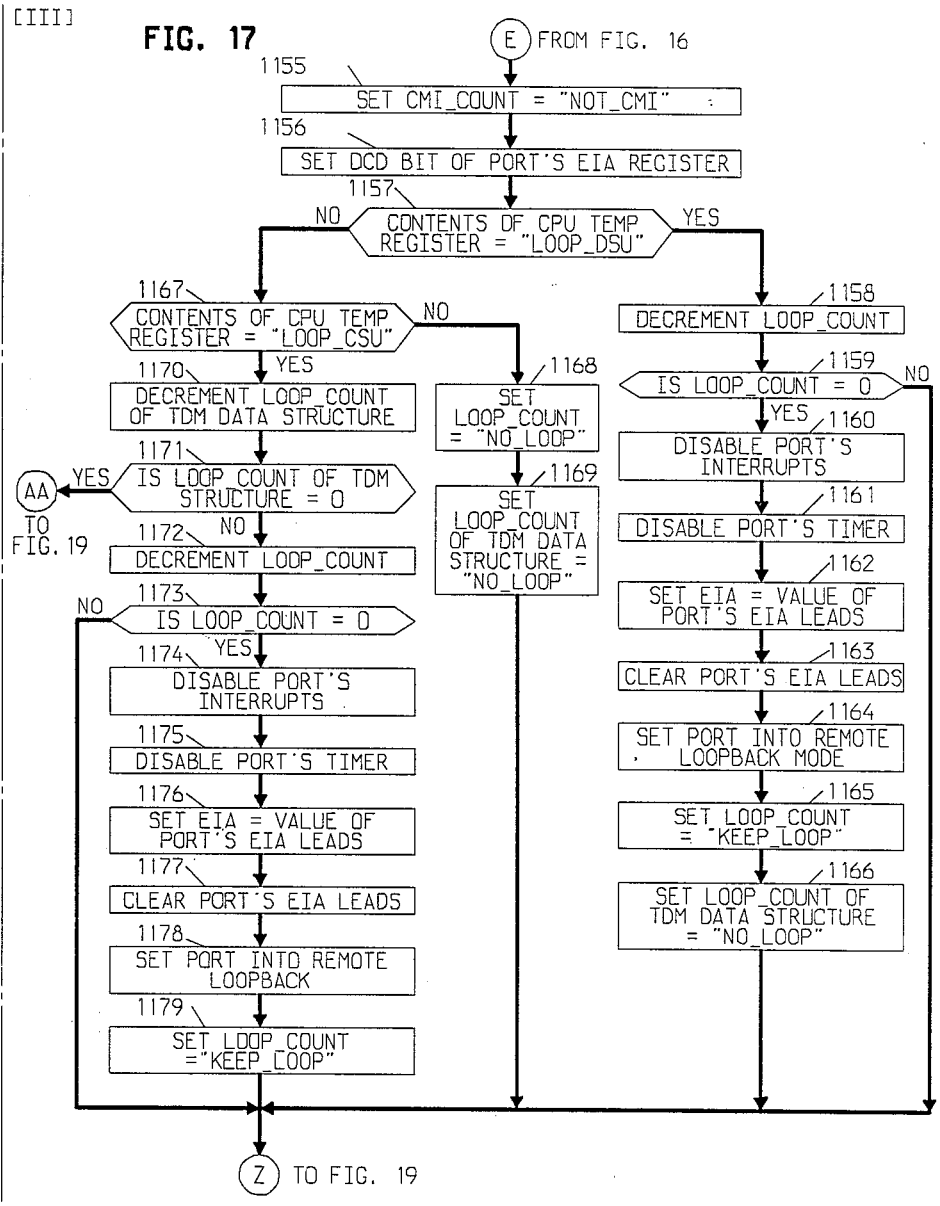
Figure 18:
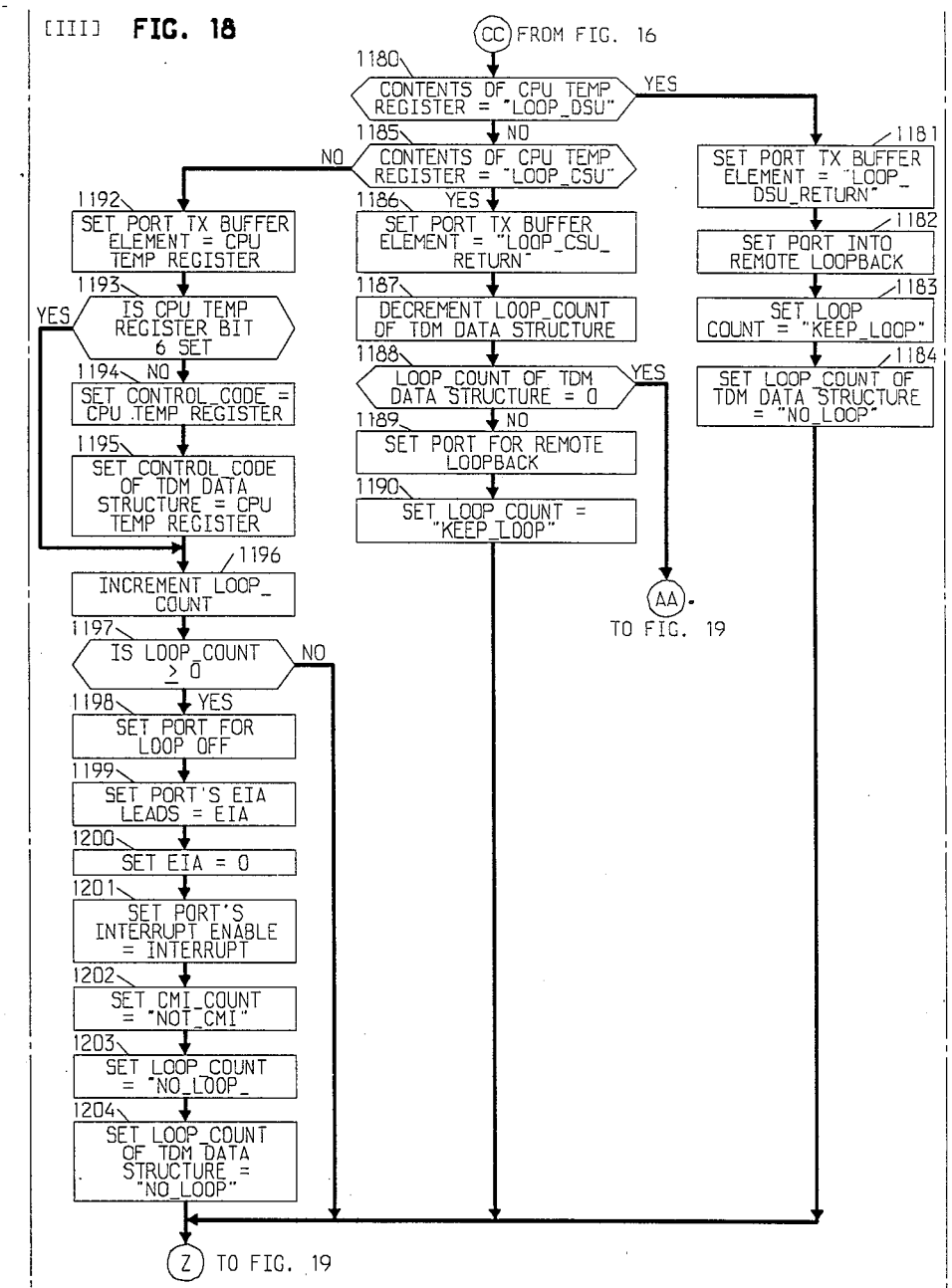
Figure 19:
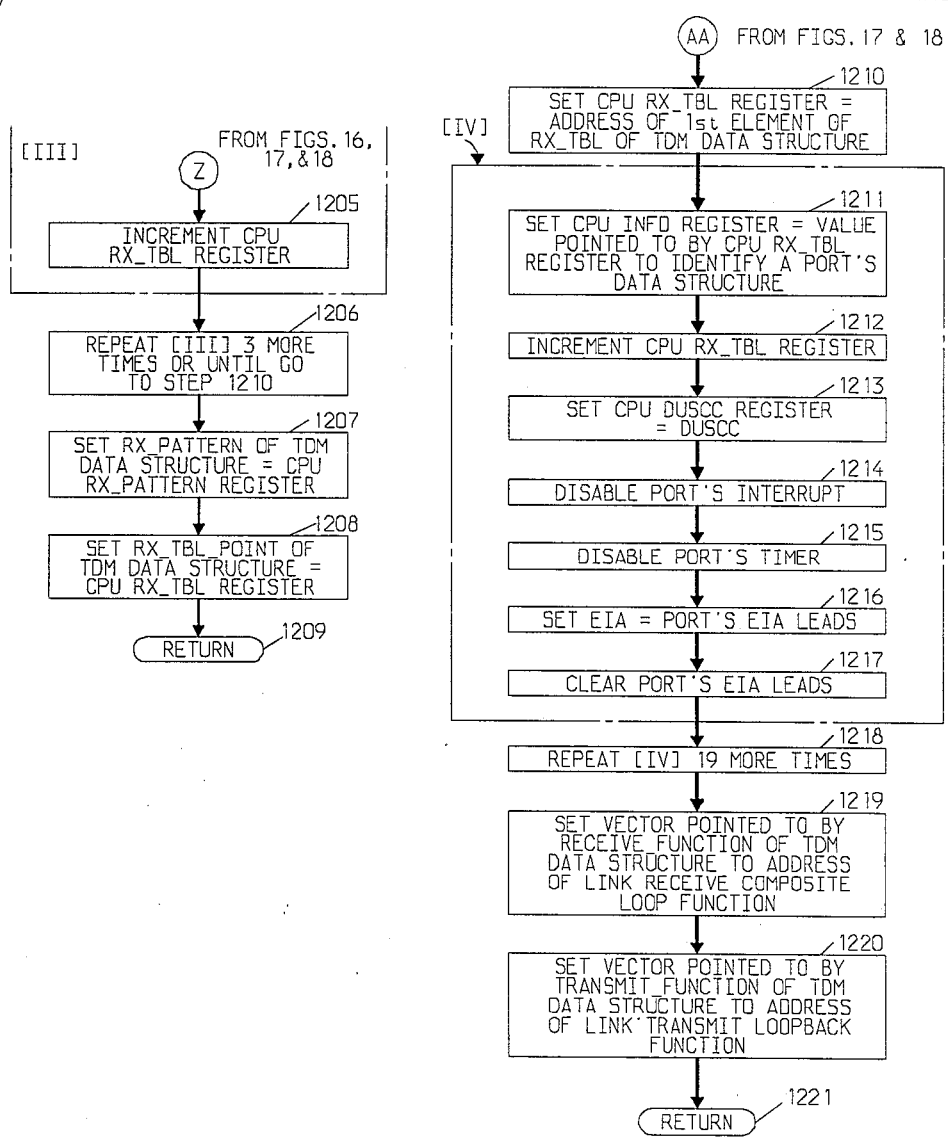

FIG. 13 shows the TDM transmit function 533. Function 533 is called every 500 microseconds to transmit 1/5th of a superframe 105 on a logical link of system link 15. In response to its invocation, at step 1000, function 533 checks link interface 30 master status register 591 to determine which one of the two logical links of system link 15 is the TDM link, at step 1001. Should both links be TDM links, they are handled in sequence. If it is logical link 0, as determined at step 1002, function 533 sets Tdm register 544 of CPU 24 to point to TDM data structure 501 of logical link 0, at step 1003, and sets DDLC register 545 of CPU 24 to point to logical link 0 in link interface 30, at step 1004. If it is determined at step 1002 that logical link 1 is the TDM link, function 533 sets Tdm register 544 to point to TDM data structure 501 of logical link 1, at step 1005, and sets DDLC register 545 to point to logical link 0, at step 1006. Henceforth, any references to TDM data structure 501 entries refer to the structure 501 of whichever logical link was identified at step 1002.

Following step 1004 or 1006, function 533 clears the transmit DMA complete bit of transmit status register 583 of link interface 30, at step 1007. At step 1008, function 533 sets transmit DMA base address register 580 of link interface 30 to point to data 643 of tx_buf 605 pointed to by tbuf 603. At step 1009, function 533 enables the transmitter of link interface 30. At step 1010, function 533 lowers the priority level of the interrupt processing commenced at step 1000, i.e., of its own execution, to allow link receive interrupts. At step 1011, function 533 sets tbuf 603 to point to tx_buf 605 identified by next 630 of tx_buf 605 that tbuf 603 has been pointing to. At step 1012, function 533 sets Tx_buf register 546 of CPU 24 to point to data 643 of tx_buf 605 that is now pointed to by Tx_buf register 546. At step 1013, function 533 sets Tx_tbl register 547 of CPU 24 to point to tx_buf 605 pointed to by next 640 of tx_buf 605 that is pointed to by Tx_buf register 546. At step 1014, function 533 loads Tx_pattern register 548 of CPU with the segment of the transmit framing pattern contained by tx_pattern 610 which corresponds to tx_buf 605 pointed to by Tx_buf register 547. At step 1015, function 533 loads Temp register 549 of CPU 24 with the byte of data from a receive buffer register 560 of a port 40 pointed to by tx_dev_ptr 660 which is pointed to by tbl 641 of tx_buf 605 pointed to by Tx_tbl register 547 of CPU 24. At step 1016, function 533 increments the contents of Tx_tbl register 547 by one. At step 1017, function 533 shifts contents of Tx_pattern register 551 of CPU 24 right by one bit, saving the carry. At step 1018, function 533 rotates the contents of Temp register 549 of CPU 24 left by one bit and loads its least-significant bit with the carry value from step 1017. At step 1019, function 533 complements the most-significant bit of Temp register 549. At step 1020, function 533 stores the contents of Temp register 549 at the address pointed to by Tx_buf register 546. At step 1021, function 533 increments the contents of Tx_buf register 546 by one. Function 533 then performs steps 1015-1021 three more times, at step 1022. Thereafter, function 534 returns to the point of its invocation, at step 1023.

FIGS. 14-19 show TDM receive function 532. Function 532 is called every 500 microseconds to receive 1/5th of a superframe 105 on a logical link of system link 15. In response to its invocation at step 1100, function 532 checks link interface 30 master status register 591 to determine which one of the two logical links of system link 15 is the TDM link, at step 1101. If it is logical link 0, as determined at step 1102, function 532 sets TDM register 544 of CPU 24 to point to TDM data structure 501 of logical link 0, at step 1103, and sets DDLC register 545 of CPU 24 to point to logical link 0 in link interface 30, at step 1004. If it is determined at step 1102 that logical link 1 is the TDM link, function 532 sets Tdm register 544 to point to TDM data structure 501 of logical link 1, at step 1105, and sets DDLC register 545 to point to logical link 1, at step 1106. Henceforth, any references to TDM data structure 501 entries refer to the structure 501 of whichever logical link was identified at step 1002.

Following step 1104 or 1106, function 532 checks receive status register 584 of link interface 30 to determine if there has been an overflow of the receive buffer 585 of this logical link, at step 1107. If the overflow-indicating bit is set to signal an overflow, as determined at step 1108, function 532 clears the overflow bit, at step 1109, restarts the receiver of link interface 30, at step 1110, and increments a receive buffer overflow count in a hardware errors register 592 of link interface 30, at step 1111.

Following step 1111, or if the receive buffer overflow bit is not found to be set at step 1108, function 532 resets the receive buffer overflow bit of the logical link's receive status register 584, at step 1112. At step 1113, function 532 sets Rx_buf 550 register of CPU 24 to point to data 633 of rx_buf 604 pointed to by rbuf 602. At step 1114, function 532 sets rbuf 602 to point to rx_buf 604 that is pointed to by next 630 of rx_buf 604 presently pointed to by rbuf 602. At step 1115, function 532 sets this logical link's receive DMA base address register 580 of link interface 30 to point to data 633 of rx_buf 604 pointed to by rbuf 602. At step 1116, function 532 re-enables the receiver of link interface 30. At step 1117, function 532 lowers the priority level of the interrupt level processing commenced at step 1100, i.e., of its own execution, to allow link transmit interrupts. At step 1118, function 532 sets the contents of Rx_pattern register 551 of CPU 24 to the contents of rx_pattern 609. At step 1119, function 532 checks whether Rx_buf register 550 is pointing to data 633 of the first rx_buf 604. If not, function 532 sets contents of Rx_tbl register 553 of CPU 24 to the contents of rx_tbl_point 614, at step 1134.

If it is found at step 1119 that Rx_buf register 550 is pointing to data 633 of the first rx_buf 604, function 532 masks off all but the 20 most significant bits of Rx_pattern register 551, at step 1120. Function 532 then checks whether the contents of lock_pattern 612 are the same as the contents of the Rx_pattern register 551, at step 1121. If so, multiplexer 10 is locked in on the received framing bit pattern, so function 532 sets the contents Rx_tbl register 553 to equal the contents of lock_point 613, at step 1135.

But if contents of lock_pattern 612 are found to not equal the contents of Rx_pattern register 551 at step 1121, function 532 must compare the received framing pattern with other stored possible patterns in order to lock in on the received pattern. Hence, at step 1122, function 532 sets Rx_patterns register 552 of CPU 24 to point to first pattern 670 of rx_patterns 608. At step 1123, function 532 sets Rx_tbl register 553 to point to the 20th rx_dev_ptr 650 of rx_tbl 606. At step 1124, function 532 checks whether pattern 670 pointed to by Rx_patterns register 552 is the same as the pattern contained by Rx_pattern register 551. If not, function 532 increments the contents of Rx_patterns register 551 by one, at step 1125, and decrements contents of Rx_tbl register 553 by one, at step 1126. Function 532 then repeats steps 1124-1126 19 more times or until the patterns compared at step 1124 match, whichever is earlier, at step 1127. If following step 1127 function 532 has still not found a match between the two patterns compared at step 1124, there has been a failure in the receive operations. Hence, function 532 increments frame_errors 615, at step 1128, to record the failure. Function 532 then sets contents of lock_error 611 to the contents of Rx_pattern register 551, at step 1129. At step 1130, function 532 sets contents of Rx_table register 553 to the contents of lock_point 613. And at step 1131, function 532 sets the contents of Rx_pattern register 551 to the contents of lock_pattern 612.

Following step 1131, or upon finding a match between the two framing patterns compared at step 1124, function 532 sets contents of lock_pattern 612 to the contents of Rx_pattern register 551, at step 1132, and sets contents of lock_point 614 to the contents of Rx_tbl register 553, at step 1133.

Following step 1133, 1134, or 1135, function 532 sets contents of Temp register 549 of CPU 24 to the value pointed to by Rx_buf register 550, at step 1136. At step 1137, function 532 rotates contents of Temp register 549 right by one bit, and saves the carry. At step 1138, function 532 rotates contents of Rx_pattern register 551 left by one bit and loads its least-significant bit with the carry from step 1137. At step 1139, function 532 sets contents of Info register 541 of CPU 24 to the value pointed to by Rx_tbl register 553. This sets Info register 541 to point to the port data structure 502 of port 40 whose assigned received time slots are now being processed. Henceforth, references to entries of a port data structure 502 refer to that port's data structure. At step 1140, function 532 sets contents of DUSCC register 542 of CPU 24 to the value of DUSCC 700. This sets DUSCC register 542 to point to registers 503 of port 40 whose assigned received time slots are now being processed. Henceforth, references to registers 503 of a port refer to that port's registers.

At step 1141, function 532 checks whether loop_count 616 is greater than zero. If not, function 532 proceeds to step 1205. If so, function 532 checks if bit number six of Temp register 549 of CPU 24 is set, at step 1142. If so, Temp register 549 contains a data byte, and function 532 sets DCD bit of EIA leads register 564 of the port 40 identified at step 1140, at step 1143; loads contents of Temp register 549 into a transmit buffer register 561 of the port 40 identified at step 1140, at step 1144; sets contents of cmi_count 706 to NOT_CMI 202, at step 1145; sets contents of loop_count 706 to NO_LOOP 203, at step 1146; sets loop_count 616 of TDM data structure 501 to NO_LOOP 203, at step 1147; and then proceeds to step 1205.

Returning to step 1142, if bit number six of Temp register 549 of CPU 24 is found not to be set, Temp register 549 contains a control byte and function 532 sets a transmit-buffer register 561 of the port 40 identified at step 1140 to hex value OXFF (marking state), at step 1148, sets contents of control_code 617 to the contents of Temp register 549, at step 1149, and also sets contents of control_code 715 of the TDM data structure 501 to the contents of Temp register 549, at step 1150. Function 532 then checks whether contents of Temp register 549 equal CMI 214, a constant (see FIG. 8), at step 1151. If so, function 532 decrements cmi_count 706 by 1, at step 1152, and checks whether contents of cmi_count 706 are less than or equal to zero, at step 1153. If not, function proceeds to step 1205; if so, function 532 clears DCD bit of EIA leads register 564 of the port 40 identified at step 1140, at step 1153A, sets contents of cmi_count 707 to zero, at step 1154, and then proceeds to step 1205.

Returning to step 1151, if contents of Temp register 549 of CPU 24 are found not to equal the constant CMI 214, function 532 sets cmi_count 707 to NOT_CMI 202, at step 1155; sets DCD bit of EIA leads register 564 of the port 40 identified at step 1140, at step 1156; and checks whether contents of Temp register 549 equal LOOP_DSU 215, a constant (see FIG. 8), at step 1157. If so, function 532 decrements loop_count 706, at step 1158; and checks whether contents of loop_count 706 are zero, at step 1159. If contents of loop_count 706 are not zero, function 532 proceeds to step 1205. If contents of loop_count 706 are zero, function 532 disables the interrupts of port 40 identified at step 1140, at step 1160; disables the timer of that port 40, at step 1161; sets contents of eia 718 to the value of that port's EIA leads register 564, at step 1162; clears the port's EIA leads register 564, at step 1163; sets that port 40 into remote loopback mode of operation, at step 1164; sets contents of loop_count 706 to KEEP_LOOP 216, a constant (see FIG. 8), at step 1165; sets contents of loop_count 616 of TDM data structure 501 to NO_LOOP 203, at step 1166; and then proceeds to step 1205.

Returning to step 1157, if it is determined that contents of Temp register 549 of CPU 24 do not equal the constant LOOP_DSU 215, function 532 checks whether the contents of temp register of CPU 24 equal to LOOP _CSU 215, another constant stored in ROM 21 (see FIG. 8), at step 1167. If not, function 532 sets contents of loop_count 706 to the constant NO_LOOP 203, at step 1168, also sets the contents of loop_count 616 of TDM data structure 501 to NO_LOOP 203, at step 1169, and then proceeds to step 1205. If contents of Temp register 549 do equal LOOP_CSU 217, at step 1167, function 532 decrements contents of loop_count 616 of TDM data structure 501 by one, at step 1170, and checks whether those contents are equal to zero, at step 1171. If so, function 532 proceeds to step 1210; if not, function 532 decrements loop_count 706 by one, at step 1171, and checks whether those contents are equal to zero, at step 1173. If loop_count 706 contents are found to not equal zero, function 532 proceeds to step 1205. If loop_count 706 contents do equal zero, function 532 disables the interrupts of port 40 identified at step 1140, at step 1174; disables that port's timer, at step 1175; sets eia 718 to the value of that port's EIA leads, at step 1176; clears the port's EIA leads, at step 1177; sets that port into remote loopback mode of operation, at step 1178; sets contents of loop_count 706 to the constant KEEP_LOOP 216, at step 1179; and then proceeds to step 1205.

Returning to step 1141, if loop_count 706 is not greater than 0, function 532 proceeds to step 1180 where it checks whether contents of Temp register 549 equal the constant LOOP_DSU 215, at step 1180. If so, function 532 sets the value of a transmit_buffer element of a register of the port 40 identified at step 1140 to LOOP_DSU_RETURN 218, a constant (see FIG. 8), at step 1181; sets that port 40 into remote loopback mode of operation, at step 1182; sets contents of loop_count 706 to the constant value KEEP_LOOP 216, at step 1183; sets contents of loop_count 616 of TDM data structure 501 equal to the constant value NO_LOOP 203, at step 1184; and then proceeds to step 1205.

Returning to step 1180, if contents of Temp register 549 are found there to not be equal to the constant LOOP_DSU 215, then function 532 checks whether those contents equal the constant value LOOP_CSU 217, at step 1185. If Temp register 549 contents do equal LOOP_CSU 217, function 532 sets the value of a transmit-buffer register 561 of the port 40 identified at step 1140 to the constant LOOP_DSU_RETURN 218, at step 1186; decrements contents of loop_count 616 of TDM data structure 501 by one, at step 1187; and checks whether those contents are zero, at step 1188. If so, function proceeds to step 1210. If Temp register 549 contents do not equal LOOP_CSU 217, function 532 sets port 40 identified at step 1140 for remote loopback mode of operation, at step 1189; sets contents of loop_count 706 to the constant value KEEP_LOOP 216, at step 1190; and then proceeds to step 1205.

Returning to step 1185, if contents of Temp register 549 are found there to not equal the value of constant LOOP_CSU 217, function 532 sets the value of a transmit-buffer register 561 of the port 40 identified at step 1140 to the contents of Temp register 549, at step 1192, and then checks whether bit 6 of the byte in Temp register 549 is set, at step 1193. If bit 6 of Temp register 549 is not set, function 532 sets contents of control_code 715 to the contents of Temp register 549, at step 1194, and also sets contents of control_code 617 of TDM data structure 501 to those contents, at step 1195. Following step 1195, or if bit 6 of Temp register 549 is found to be set at step 1193, function 532 increments loop_count 706 by one, at step 1196, and checks whether that count is greater than zero, at step 1197.

If loop_count 706 is less than zero, function 532 proceeds to step 1205. If loop_count 706 is greater than or equal to zero, function 532 sets the port 40 identified at step 1140 for non-remote loopback, or loop off, operation, at step 1198; sets the EIA leads of that port 40 to the value of eia 718, at step 1199; sets the contents of eia 718 to zero, at step 1200; sets the contents of the port's interrupt control register 562 to the contents of interrupt 716, at step 1201; sets contents of cmi_count 707 to the constant value NOT_CMI 202, at step 1202; sets contents of loop_count 706 to the constant value NO_LOOP 203, at step 1203; also sets contents of loop_count 616 of TDM data structure 501 to the constant value NO_LOOP 203, at step 1204; and then proceeds to step 1205.

At step 1205, function 532 increments contents of Rx_tbl register 553 of CPU 24 by one. Function 532 then repeats steps 1136-1205 three more times, or until execution is diverted to step 1210, whichever is earlier, at step 1206. If execution has not been diverted to step 1210 following step 1206, function 532 sets the contents of rx_pattern 609 of TDM data structure 501 equal to the contents of Rx_pattern register 551 of CPU 24, at step 1207, and sets the contents of rx_tbl_point 614 of TDM data structure 501 equal to the contents of Rx_tbl register 553, at step 1208. Function 532 then returns to the point of its invocation, at step 1209.

At step 1210, function 532 sets contents of Rx_tbl register 553 of CPU 24 to point to first rx_dev_ptr 650 of rx_tbl 606 of the TDM data structure 501. At step 1211, function 532 sets contents of Info register 541 of CPU 24 to the address of the port data structure 502 that is pointed to be the contents of Rx_tbl register 553 of CPU 24. Henceforth, references to port data structure entries are to entries of this structure 502 identified by Info register 541. At step 1212, function 532 increments the contents of Rx_tbl register 553 by one. At step 1213, function 532 sets contents of DUSCC register 542 of CPU 24 to the contents of DUSCC 700 of the port data structure 502 identified at step 1211. At step 1214, function 532 disables the interrupts of port 40 that corresponds to the structure 502 identified at step 1211. At step 1215, function 532 disables the timer of that port 40. At step 1216, function 532 sets contents of eia 718 of the structure 502 identified at step 1211 to the value of the EIA leads of that port 40. And at step 1217, function 532 disables that port's EIA leads. Function 532 then repeats steps 1211-1217 19 more times, at step 1218. At step 1219, function 532 sets vector 516 that is pointed to by receive_function 600 of TDM data structure 501 to point to link receive composite loop function 537 among routines 530. At step 1220, function 532 sets vector 515 that is pointed to by transmit function of TDM data structure 501 to point to link transmit loop function 536. Function 532 then returns to the point of its invocation, at step 1221.

Figure 20:
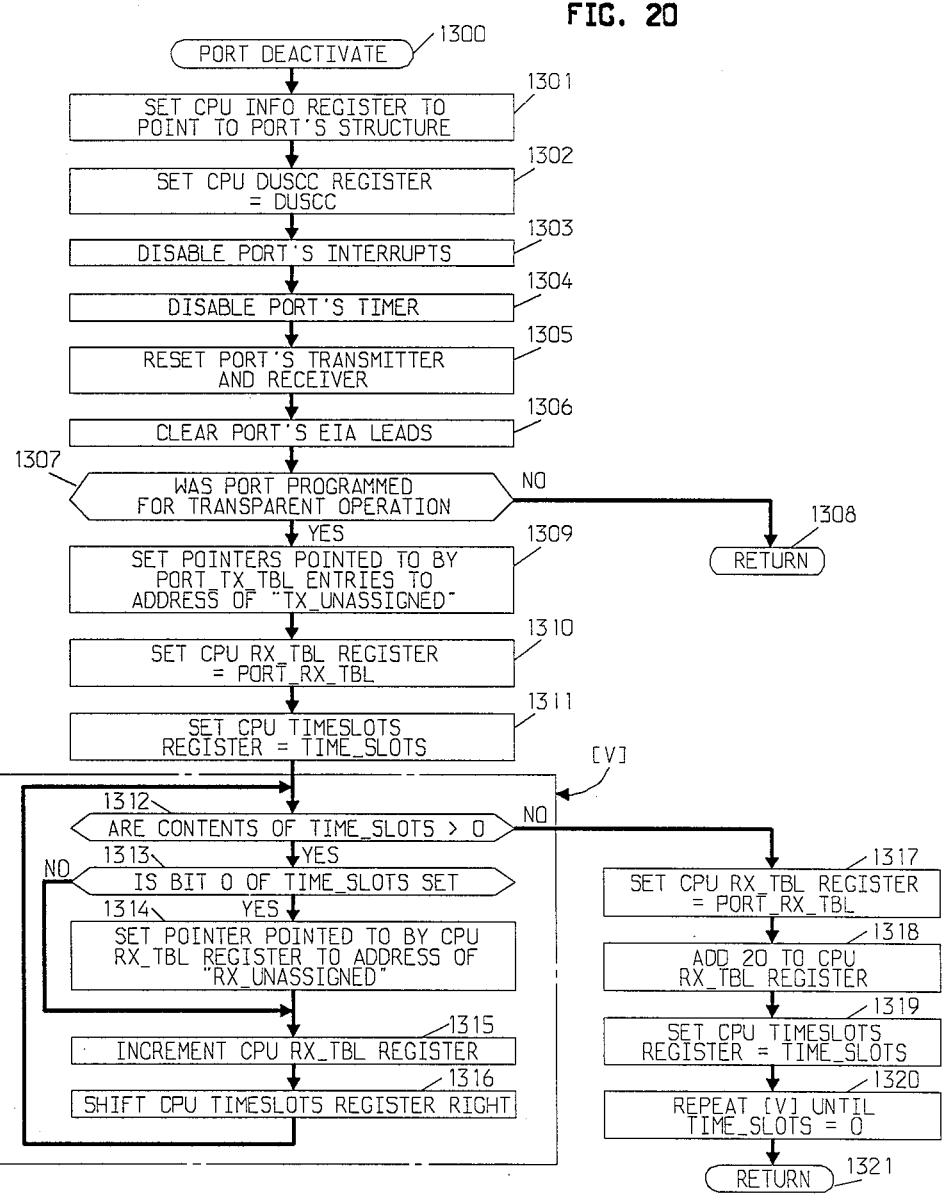
FIG. 20 is a flow diagram of the port deactivate function of the multiplexer.

FIG. 20 shows the port deactivate function 538. Execution of function 538 is initiated by a control message identifying port 40 that is to be deactivated which is provided to multiplexer 10 by switching system 11 through control channel interface 31. In response to its invocation at step 1300, function 538 sets contents of Info register 541 of CPU 24 to identify port data structure 502 of the port 40 that is to be deactivated, at step 1301. Henceforth, references to port data structure entries are to entries of this structure 502. At step 1302, function 538 sets contents of CPU 24 DUSCC register 542 to the contents of DUSCC 700. DUSCC register 542 thereby points to registers 503 of the port 40 that is to be deactivated. At step 1303, function 538 disables the interrupts of the port 40 identified at step 1302. At step 1304, function 538 disables that port's timer. At step 1305, function 538 resets that port's transmitter and receiver; and at step 1306, function 538 clears that port's EIA leads. Function 538 then checks register 565 of that port 40 to determine whether the port was programmed for transparent operation, at step 1307. If not, port deactivation is completed, and function 538 returns to the point of its invocation, at step 1308. If so, function 538 sets contents of transmit device pointer 660 that are pointed to by entries 730 of port_tbl 702 to the address of TX_UNASSIGNED 225, a constant representing a device that sends an "unassigned channel" code (i.e, the value of UNASSIGNED 222), at step 1309. At step 1310, function 538 sets contents of CPU 24 Rx_tbl register 553 to the contents of port_tbl 704. At step 1311, function 538 sets contents of CPU 24 Timeslots register 557 to the contents of time_slots 705. And at step 1312, function 538 checks whether contents of time_slots 705 exceed zero.

If contents of time_slots 705 do exceed zero, function 538 checks whether bit 0 of time_slots 705 is set, at step 1313. If so, function 538 sets contents of the receive device pointer 650 that is pointed to by CPU 24 Rx_tbl register 553 to the address of UNASSIG-NED_RECEIVE 201, the constant that denotes the address of a dummy port data structure that contains a pointer to a dummy DUSCC, at step 1314. Following step 1314, or if bit 0 of time_slots 705 is found to not be set at step 1313, function 538 increments the contents of Rx_tbl register 553 by one, at step 1315. At step 1316, function 538 shifts contents of Timeslots register 557 right by one bit. Function 538 then returns to step 1312.

If contents of time_slots 705 are not found at step 1312 to exceed zero, function 538 sets contents of Rx_tbl register 553 to the contents of port_rx_tbl 704, at step 1317. Function 538 then adds 20 to the contents of Rx_tbl register 553, at step 1318, and sets contents of Timeslots register 557 to the contents of time_slots 705, at step 1319. Function 538 then repeats steps 1312-1316 until contents of Timeslots register 557 are equal to zero, at step 1320. Function 538 then returns to the point of its invocation, at step 1321.

Figure 21:
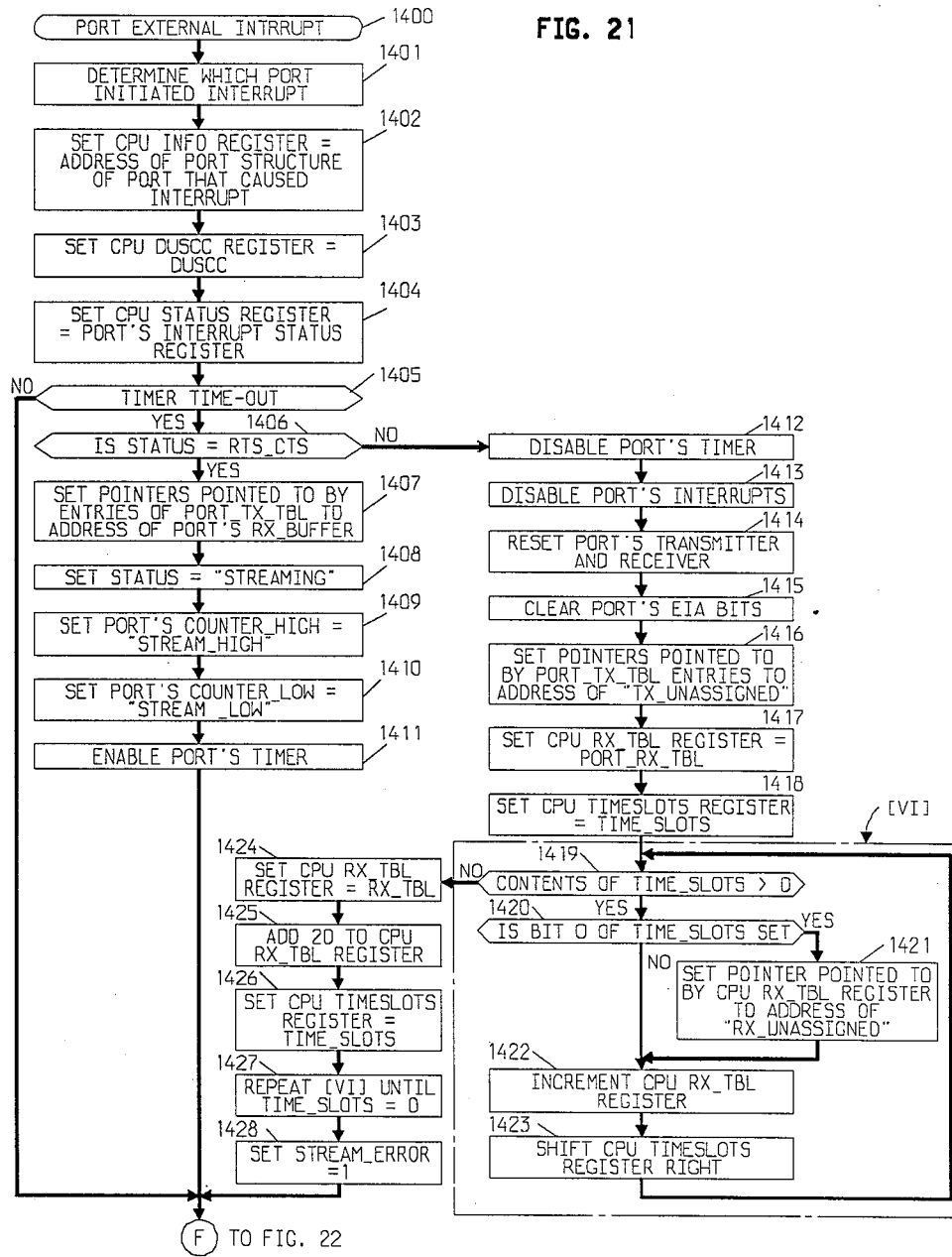
FIGS. 21–22 are a flow diagram of the port external interrupt function of the multiplexer.
Figure 22:
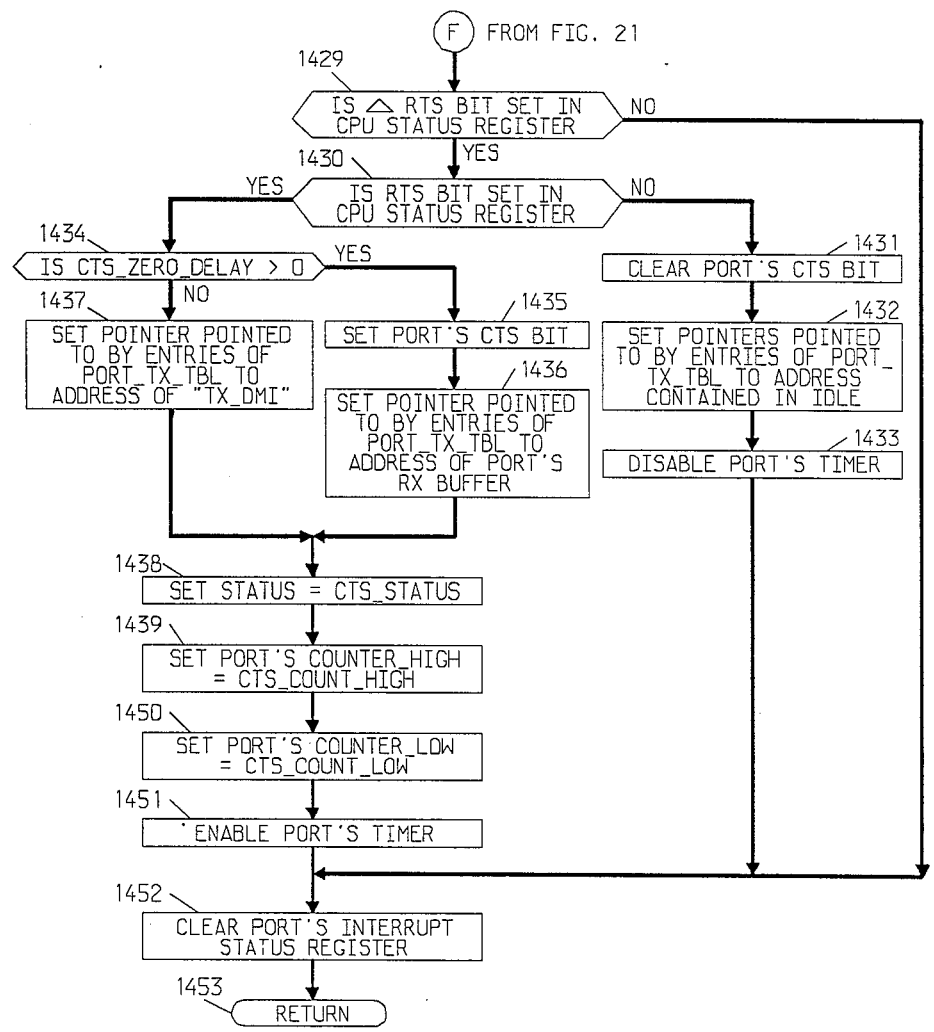

FIGS. 21-22 show the port external interrupt function 539. Execution of function 539 is initiated by the timing out of a port 40 timer, or change of state of port 40 RTS signal. In response to its invocation, at step 1400, function 539 determines which port 40 initiated the interrupt, at step 1401. Function 539 does so on the basis of which port's external interrupt vector 513 it received at step 1400. At step 1402, function 539 sets contents of CPU 24 Info register 541 to point to port data structure 502 of the port 40 that was determined at step 1401 to have caused the interrupt. At step 1403, function 539 sets contents of CPU 24 DUSCC register 542 to the contents of DUSCC 700 of the structure 502 pointed to in step 1402, thereby causing DUSCC register 542 to point to ports 503 of the port 40 identified at step 1401. Henceforth, references to port registers 503 and port data structure 502 entries refer to the port 40 identified at step 1401. At step 1404, function 539 sets contents of CPU 24 Status register 554 to the contents of the port's interrupt control register 562. At step 1405, function 539 checks whether the timer timed out. If not, function 539 proceeds to step 1429; if so, function 539 checks whether contents of status 713 equal the value of the constant RTS_CTS 213, at step 1406. If status 713 does represent RTS_CTS 213, function 539 sets device pointers that are pointed to by entries 730 of port_tx-_tbl 702 to point to the receive buffer 561 of the port identified at step 1401, at step 1407. At step 1408, function 539 sets status 713 to the value of the constant STREAMING 211. At step 1409, function 539 sets the port's timer control register 563 counter_high value to the value of the constant STREAM_HIGH 209; at step 1410 it sets the port's counter_low value to the value of the constant STREAM_LOW 210, another constant; and at step 1411 it enables the port's timer. Function 539 then proceeds to step 1429.

Returning to step 1406, if status 713 does not represent RTS_CTS 213, function 539 disables the port's timer, at step 1412; disables the port's interrupts, at step 1413; resets the port's transmitter and receiver, at step 1414; and clears the port's EIA bits, at step 1415. Function 539 then performs steps 1416-1427 which are identical to steps 1309-1320, respectively. Function 539 then sets contents of stream_error 719 to one, at step 1428, and proceeds to step 1429.

At step 1429, function 539 checks if the bit in CPU 24 Status register 554 that is not masked by ΔRTS 219, a constant, is set. If not, function 539 proceeds to step 1452; if so, function 539 checks if the bit in the Status register 554 that is not masked by RTS 220, another constant, is set, at step 1430. If the bit not masked by RTS 220 is not set in Status register 554, function 539 clears the ports CTS bit, at step 1431; sets contents of the transmit device pointers that are pointed to by entries 730 of port_tx_tbl 702 to the contents of idle 703, at step 1432; and disables the port's timer, at step 1433. Function 539 then proceeds to step 1452.

Returning to step 1430, if the bit not masked by RTS 220 is set in Status register 554, function 539 checks whether contents of cts_zero_delay 712 exceed zero, at step 1434. If so, function 539 sets the port's CTS bit, at step 1435; and sets contents of the transmit device pointers that are pointed to by entries 730 of port_tx-_tbl 702 to the address of the port's receive buffer, at step 1436. Returning to step 1434, if contents of cts_zero_delay 712 do not exceed zero, function 539 sets contents of the transmit device pointers that are pointed to by entries 730 of port_tx_tbl 702 to the address of TX_DMI 226, a constant representing a dummy device that sends "data mode idle", at step 1437.

Following step 1436 or 1437, function 539 sets contents of status 713 to the contents of cts_status 711, at step 1438. Function 539 then sets the port's timer control register 563 counter_high value to the contents of cts_count_high 709, at step 1439; sets the port's counter_low value to the contents of cts_count_low 710, at step 1450; and enables the port's timer, at step 1451. Function 539 then proceeds to step 1452.

At step 1452, function 539 clears the port's interrupt control register 563, and then returns to the point of its invocation, at step 1453.

Figure 23:
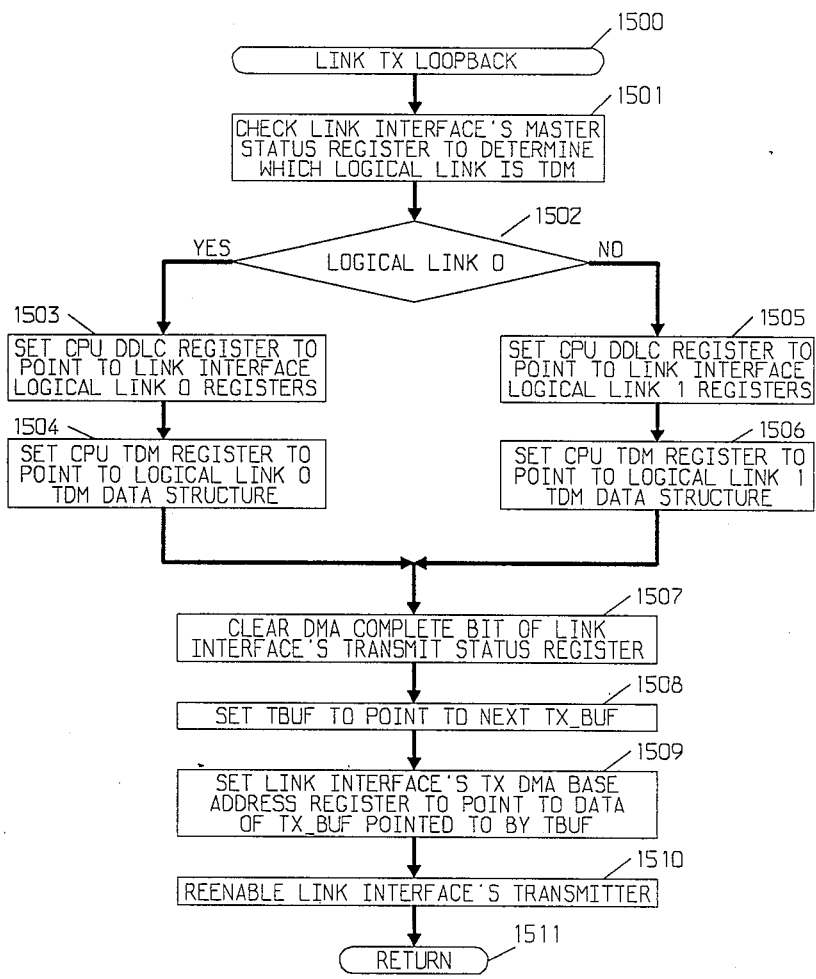
FIG. 23 is a flow diagram of the link transmit loopback function of the multiplexer.

FIG. 23 shows the link transmit loopback function 536. Function 536 is called every 500 microseconds, as a consequence of step 1220 of TDM receive function 532. In response to its invocation, at step 1500, function 536 checks contents of master status register 591 of link interface 30 to determine which logical link is the TDM link, at step 1501. If it is logical link 0, as determined at step 1502, function 536 sets CPU 24 DDLC register 545 to point to logical link 0 registers of link interface 30, at step 1503, and sets CPU 24 Tdm register 544 to point to TDM data structure 501 of logical link 0, at step 1504. If it is determined at step 1502 that logical link 1 is the TDM link, function 536 sets DDLC register 545 to point to logical link 1 registers of link interface 30, at step 1505, and sets Tdm register 544 to point to TDM data structure 501 of logical link 1, at step 1506. Henceforth, references to link interface 30 registers and TDM data structure 501 entries pertain to the registers and TDM structure of whatever logical link was identified at step 1502.

Following step 1504, or 1506, function 536 clears the DMA complete bit of the transmit status register 585 of link interface 30, at step 1507, and sets contents of tbuf 603 to point to tx_buf 605 that is identified by next 630 of tx_buf 605 that is presently pointed to by tbuf 603, at step 1508. At step 1509, function 536 sets contents of the transmit DMA base address register 581 of link interface 30 to point to data 643 of tx_buf 605 that is pointed to by tbuf 603. At step 1510, function 536 re-enables the transmitter of link interface 30. Function 536 then returns to the point of its invocation, at step 1511.

Figure 24:
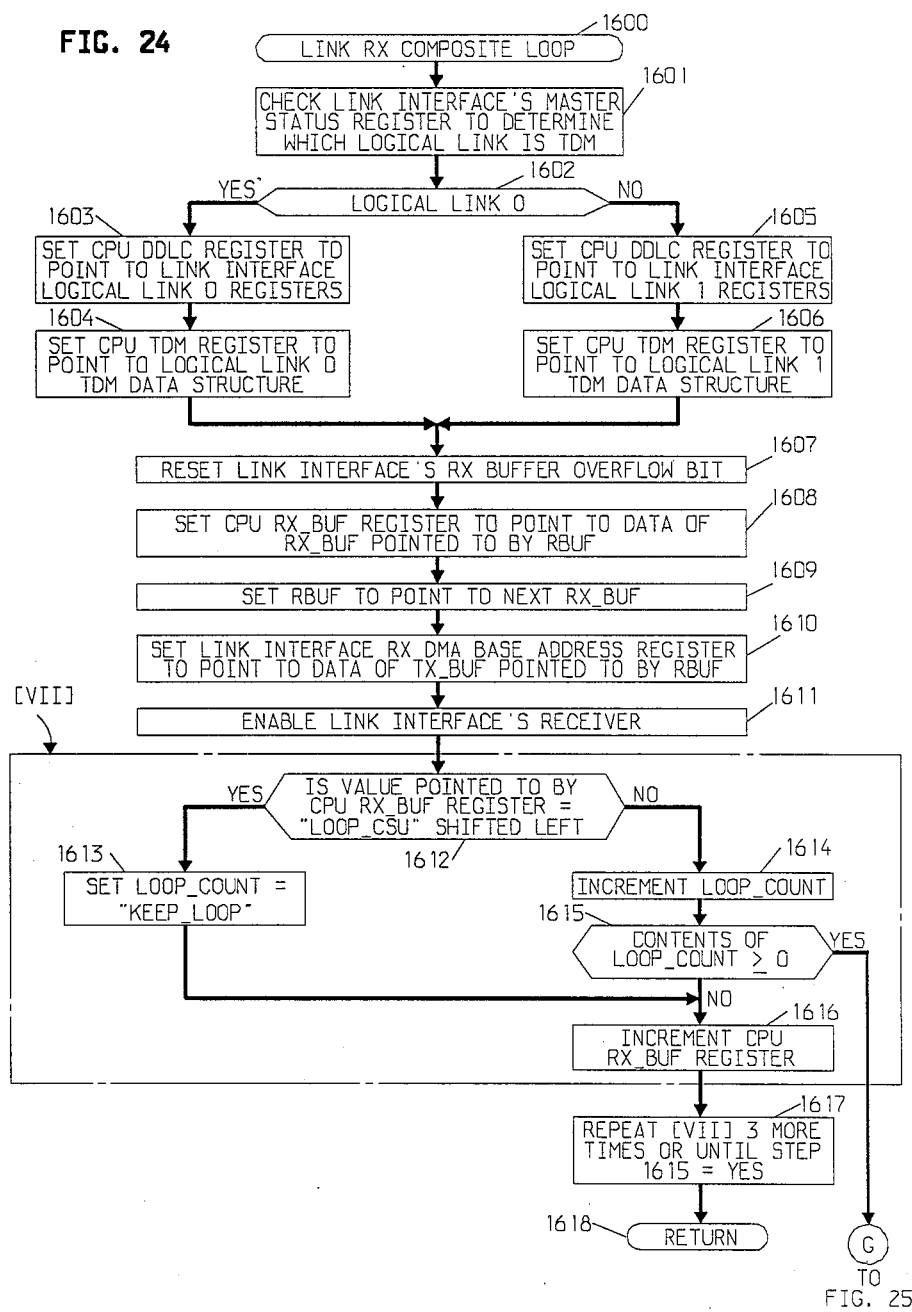
FIGS. 24–25 are a flow diagram of the link receive composite loop function of the multiplexer.
Figure 25:
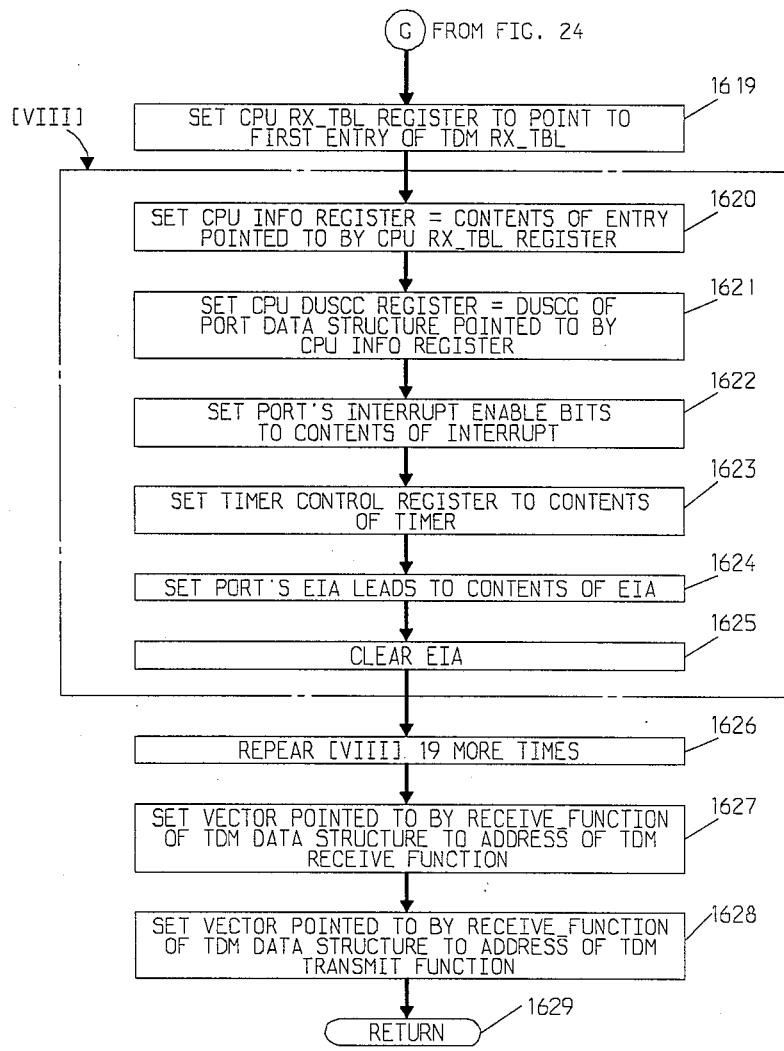

FIGS. 24–25 show the link receive composite loop function 537. Function 537 is called every 500 microseconds, as a consequence of step 1219 of TDM receive function 532. In response to its invocation, at step 1600, function 536 performs steps 1601-1606 to identify which logical link is the TDM link and to set pointers to that logical link's interface 30 registers and TDM data structure 501. These steps are identical to steps 1501-1506 of link transmit loopback function 536. Henceforth, references to link interface 30 registers and TDM data structure 501 entries pertain to the registers and TDM structure of whatever logical link was identified at step 1602.

Following step 1604 or 1606, function 537 resets the receive buffer overflow bit of receive status register 584 of link interface 30, at step 1607. At step 1608, function 537 sets contents of CPU 24 Rx_buf register 550 to point to data 633 of rx_buf 604 that is pointed to by rbuf 602. At step 1609, function 537 sets contents of rbuf 602 to point to rx_buf 604 pointed to by next 630 of rx_buf 604 that is presently pointed to by rbuf 602. At step 1610, function 537 sets contents of receive DMA base address register 580 of link interface 30 to point to data 633 of rx_buf 604 that is pointed to by rbuf 602. At step 1611, function 537 enables the receiver of link interface 30. Then, at step 1612, function 537 checks whether the contents of data 633 that is pointed to by Rx_buf register 550 are equal the value of LOOP_CSU 17, a constant, shifted left by one. If so, function 537 sets contents of loop_count 616 to the value of the constant KEEP_LOOP 216, at step 1613, and then proceeds to step 1616; if not, function 537 increments the contents of loop_count 616 by one, at step 1614, and checks whether the contents of loop_count 616 are greater than or equal to zero, at step 1615. If loop_count 616 is less than zero, function 537 proceeds to step 1616.

At step 1616, function 537 increments contents of CPU 24 Rx_buf register 550 by one. Function 537 then repeats steps 1612-1616 three more times, or until the contents of loop_count 616 are found to equal or exceed zero at step 1615, whichever occurs earlier, at step 1617. If execution of step 1617 has not resulted in the "yes" leg of step 1615 being taken, function 537 returns to the point of its invocation, at step 1618.

Returning to step 1615, if contents of loop_count 616 are found there to equal or exceed zero, function 537 sets contents of CPU 24 Rx_tbl register 553 to point to first tx_dev_ptr 660 of tx_tbl 607, at step 1619. At step 1620, function 537 sets contents of CPU 24 Info register 541 to the contents of entry 660 pointed to by Rx_tbl register 553, thereby causing Info register 541 to point to a port data structure 502. At step 1621, function 537 sets contents of CPU 24 DUSCC register 542 to the contents of DUSCC 700 of port data structure 502 that is pointed to by Info register 541, thereby causing DUSCC register 542 to point to registers 503 of a port 40 associated with the structure 502 identified at step 1620. Henceforth, all references to port data registers 503 are to registers of the port 40 identified at step 1621. At step 1622, function 537 sets the interrupt enable bits of that port's interrupt control register 562 to the contents of interrupt 716. At step 1623, function 537 sets that port's timer control register 563 to the contents of timer 717. At step 1624, function 537 sets that port's EIA leads register 564 to the value contained in eia 718. At step 1625, function 537 clears contents of eia 718. And at step 1626, function 537 repeats steps 1620-1625 19 more times.

Following step 1626, function 537 re-sets interrupt vector 516 that is pointed to by receive_function 600 of TDM data structure 501 to point to TDM receive function 532, at step 1627. Function 537 also re-sets interrupt vector 515 that is pointed to by transmit_function 601 to point to TDM transmit function 533, at step 1628. Function 538 then returns to the point of its invocation, at step 1629.

Of course, it should be understood that various changes and modifications to the illustrative embodiment described above will be apparent to those skilled in the art. For example, TDM transmit functions (multiplexing) and TDM receive functions (demultiplexing) may be performed by separate CPUs operating concurrently. Or, both logical links of system link 15 may be subrate-multiplexed either if separate CPUs are used for each link or if slower links or a faster multiplexer CPU than those of the illustrative embodiment are used. Alternatively, one logical link may be subrate-multiplexed and the other logical link may be statistically multiplexed, and their processing may make use of CPU on a time-shared basis. As a variation of this last alternative, the multiplexer may perform both statistical and subrate multiplexing on the same logical link, either by first statistically-multiplexing some channels and then subrate-multiplexing this statistically-multiplexed signal stream with other channels, or by first subrate-multiplexing some channels and then statistically multiplexing this subrate-multiplexed signal stream with other channels. Such changes and modifications can be made without departing from the spirit and the scope of the invention and without diminishing its attendant advantages. It is therefore intended that all such changes and modifications be covered by the following claims.

I claim:

1. A subrate multiplexer comprising
means for receiving a plurality of first signal streams each at a subrate of a predetermined transmission rate;
a general-purpose programmable processor having a central processing unit and storage means, connected to the receiving means and programmed to subrate-multiplex the plurality of received first signal streams into a second signal stream such that the second signal stream comprises a plurality of adjacent frames each having an identical sequence of time slots of equal duration, each one of the plurality of adjacent frames including an identical first framing pattern comprising a sequence of values of framing bits, with different ones of the time slots of a frame carrying signals from different ones of the first signal streams and with sequentially identical time slots of a plurality of the adjacent frames carrying signals from the same first signal stream, wherein the central processing unit under program control forms the second signal stream in the storage means by repeatedly (a) retrieving from each received first signal stream different sequentially-received signals that will be carried by a single time slot in the second signal stream, (b) storing the signals retrieved from the plurality of first signal streams in the storage means in a sequence in which the time slots that will carry the retrieved signals carry signals from different ones of the first signal streams in the second signal stream, and (c) storing the values of the framing bits of the framing pattern in the storage means next to the first signal streams' stored signals, to interleave the framing pattern with the signals of the first signal streams in the storage means; and means for transmitting the second signal stream at the predetermined transmission rate.

2. The subrate multiplexer of claim 1 further comprising means for receiving a third signal stream having a predetermined transmission rate, the third stream comprising a plurality of adjacent frames each having an identical sequence of time slots of equal duration with different ones of the time slots of a frame carrying signals from different ones of fourth signal streams each at a subrate of the transmission rate of the third signal stream and with sequentially identical time slots of a plurality of the adjacent frames carrying signals from the same fourth signal stream, and second means for transmitting the plurality of the fourth signal streams each at its own subrate; and wherein the processor is programmed to subrate-multiplex the plurality of first signal streams into the second signal stream during first time intervals, and is further programmed to subrate-demultiplex the third signal stream into the plurality of fourth signal streams during second time intervals interspersed with the first time intervals.

3. The subrate multiplexer of claim 2 wherein each time slot of each frame of the third signal stream includes a framing bit of the first framing pattern; the processor includes memory means for storing at least one complete received frame of the third signal stream, and memory means for storing a plurality of second framing patterns each comprising at least one complete first framing pattern rotated by a different number of the framing bits than another second framing pattern; and the processor is programmed (a) to compare a third framing pattern, comprising a sequence of the values of the framing bits of time slots of the stored at least one complete received frame, with individual ones of the second framing patterns, (b) to determine, from a match between the third framing pattern and one of the second framing patterns, which fourth signal stream's signals any time slot of the stored at least one complete received frame is carrying, and (c) to send to the second means for transmission on different links the stored time slots determined to carry signals of different fourth signal streams.

4. The subrate multiplexer of claim 1 wherein the receiving means include means for receiving a plurality of third signal streams;

the processor is programmed to subrate-multiplex the plurality of first signal streams into the second signal stream during first time intervals, and is further programmed to statistically multiplex the third signal streams into a fourth signal stream during second time intervals interspersed with the first time intervals; and the transmitting means include means for transmitting the second signal stream on a first logical channel and transmitting the fourth signal stream on a second logical channel.

5. The multiplexer of claim 1 wherein the receiving means include means for receiving a plurality of third signal streams each at a rate lower than the subrate of one of the first signal streams; and the processor is further programmed to statistically multiplex the plurality of third signal streams into the one first signal stream during first time intervals, and is programmed to subrate-multiplex the plurality of first signal streams including the one first signal stream into the second signal stream during second time intervals interspersed with the first time intervals.

6. The subrate multiplexer of claim 1 wherein:

the receiving means include means for receiving at least one third signal stream;

the processor is programmed to subrate-multiplex the plurality of first signal streams into the second signal stream during first time intervals, and is further programmed to statistically multiplex the second signal stream with the at least one third signal stream into a fourth signal stream during second time intervals interspersed with the first time intervals; and the transmitting means include means for transmitting the fourth signal stream at a rate higher than the rate of the second signal stream.

7. A subrate demultiplexer comprising means for receiving a first signal stream having a predetermined transmission rate;

a general-purpose programmable processor having a central processing unit and storage means, connected to the receiving means and programmed to subrate-demultiplex the first signal stream, which comprises a plurality of adjacent frames each having an identical sequence of time slots of equal duration, each one of the plurality of adjacent frames including an identical first framing pattern comprising a sequence of values of framing bits, with different ones of the time slots of a frame carrying signals from different ones of second signal streams each at a subrate of the transmission rate of the first signal stream and with sequentially identical time slots of a plurality of the adjacent frames carrying signals from the same second signal stream, into the plurality of second signal streams, wherein the central processing unit under program control forms the second signal streams in the storage means by repeatedly (a) searching through received signals of the first signal stream in the storage means to find the framing pattern, (b) using the found framing pattern to allocate the signals of the first signal stream that are stored in the storage means to the individual second signal streams, (c) storing the signals allocated to each individual second signal stream together in a sequence in which the second signal stream's allocated signals were received, and (d) discarding the received values of the framing bits of the framing pattern from the storage means; and means for transmitting the plurality of the second signal streams each at its own subrate.

8. The subrate demultiplexer of claim 7 wherein each time slot of each frame includes a framing bit and of the first framing pattern;

the processor includes memory means for storing at least one complete received frame of the first signal stream, and memory means for storing a plurality of second framing patterns each comprising at least one complete first framing pattern rotated by a different number of the framing bits than another second framing pattern; and the processor is programmed (a) to compare a third framing pattern, comprising a sequence of the values of the framing bits of time slots of the stored at least one complete received frame, with individual ones of the second framing patterns, (b) to determine, from a match between the third framing pattern and one of the second framing patterns, which second signal stream's signals any time slot of the stored at least one complete received frame is carrying, and (c) to send to the transmitting means for transmission on different links the stored time slots determined to carry signals of different second signal streams.

9. A method of subrate multiplexing a plurality of first signal streams into a second signal stream, comprising the steps of:

receiving a plurality of the first signal streams each at a subrate of a predetermined transmission rate;

subrate-multiplexing the plurality of received first signal streams into a second signal stream such that the second signal stream comprises a plurality of adjacent frames each having an identical sequence of time slots of equal duration, each one of the plurality of adjacent frames including an identical first framing pattern comprising a sequence of values of framing bits, with different ones of the time slots of a frame carrying signals from different ones of the first signal streams and with sequentially identical time slots of a plurality of the adjacent frames carrying signals from the same first signal stream, by executing a program in a general-purpose programmable processor having a central processing unit and storage means wherein the central processing unit under program control forms the second signal stream in the storage means by repeatedly (a) retrieving from each received first signal stream different sequentially-received signals that will be carried by a single time slot in the second signal stream, (b) storing the signals retrieved from the plurality of first signal streams in the storage means in a sequence in which the time slots that will carry the retrieved signals carry signals from different ones of the first signal streams in the second signal strem, and (c) storing the values of the framing bits of the framing pattern next to the first signal stream' stored signals, to interleave the framing pattern with the signals of the first signal streams in the storage means; and transmitting the second signal stream at the predetermined transmission rate.

10. The method of claim 9 further comprising the steps of:

receiving a third signal stream having a predetermined transmission rate, the third stream comprising a plurality of adjacent frames each having an identical sequence of time slots of equal duration with different ones of the time slots of a frame carrying signals from different ones of fourth signal streams each at a subrate of the transmission rate of the third signal stream and with sequentially identical time slots of a plurality of the adjacent frames carrying signals from the same fourth signal stream;

subrate-demultiplexing the third signal stream into the plurality of fourth signal streams in a general-purpose programmable processor by execution of a program in the processor; and transmitting the plurality of the fourth signal streams each at its own subrate.

11. The method of claim 10 wherein:

the step of subrate-multiplexing comprises the step of subrate-multiplexing the plurality of first signal streams into the second signal stream in a first general-purpose programmable processor by executing a multiplexing program in the first processor during first time intervals; and the step of subrate-demultiplexing comprises the step of subrate-demultiplexing the third signal stream into the plurality of fourth signal streams in the first processor by executing a demultiplexing program in the first processor during second time intervals interspersed with the first time intervals.

12. A method of subrate demultiplexing a first signal stream into a plurality of second signal streams, comprising the steps of:

receiving a first signal stream having a predetermined transmission rate;

subrate-demultiplexing the first signal stream, which comprises a plurality of adjacent frames each having an identical sequence of time slots of equal duration, each one of the plurality of adjacent frames including an identical first framing pattern comprising a sequence of values of framing bits, with different ones of the time slots of a frame carrying signals from different ones of second signal streams each at a subrate of the transmission rate of the first signal stream and with sequentially identical time slots of a plurality of the adjacent frames carrying signals from the same second signal stream, into the plurality of second signal streams, by executing a program in a general-purpose programmable processor having a central processing unit and storage means wherein the central processing unit under program control forms the second signal streams in the storage means by repeatedly (a) searching through received signals of the first signal stream in the storage means to find the framing pattern, (b) using the found framing pattern to allocate the signals of the first signal stream that are stored in the storage means to the individual second signal streams, (c) storing the signals allocated to each individual second signal stream together in a sequence in which the second signal stream's allocated signals were received, and (d) discarding the received values of the framing bits of the framing pattern from the storage means; and transmitting the plurality of the second signal streams each at its own subrate.

13. The subrate demultiplexing method of claim 12 wherein each time slot of each frame includes a framing bit of the first framing pattern; and wherein the step of subrate-multiplexing comprises the steps of storing at least one complete received frame of the first signal stream in memory means of the processor which also stores a plurality of second framing patterns each comprising at least one complete first framing pattern rotated by a different number of the framing bits than another second framing pattern, comparing in the processor a third framing pattern, comprising a sequence of the values of the framing bits of time slots of the stored at least one complete received frame, with individual ones of the second framing patterns, determining in the processor, from a match between the third framing pattern and one of the second framing patterns, which second signal stream's signals any time slot of the stored at least one complete received frame is carrying, and sending to the transmitting means for transmission on different links the stored time slots determined to carry signals of different second signal streams.

14. A subrate demultiplexer comprising means for receiving a first signal stream having a predetermined transmission rate;

a general-purpose programmable processor connected to the receiving means and programmed to subrate-demultiplex the first signal stream, which comprises a plurality of adjacent frames each having an identical sequence of time slots of equal duration, each time slot of each frame including a framing bit and each one of the plurality of adjacent frames including an identical first framing pattern comprising a sequence of values of the framing bits, with different ones of the time slots of a frame carrying signals from different ones of second signal streams each at a subrate of the transmission rate of the first signal stream and with sequentially identical time slots of a plurality of the adjacent frames carrying signals from the same second signal stream, into the plurality of second signal streams, the processor including memory means for storing at least one complete received frame of the first signal stream, and memory means for storing a plurality of second framing patterns each comprising at least one complete first framing pattern rotated by a different number of the framing bits than another second framing pattern, and the processor being programmed (a) to compare a third framing pattern, comprising a sequence of the values of the framing bits of time slots of the stored at least one complete received frame, with individual ones of the second framing patterns, (b) to determine, from a match between the third framing pattern and one of the second framing patterns, which second signal stream's signals any time slot of the stored at least one complete received frame is carrying, and (c) to send for transmission on different links the stored time slots determined to carry signals of different second signal streams; and means for transmitting the plurality of the second signal streams each at its own subrate.

15. A method of subrate demultiplexing a first signal stream into a plurality of second signal streams, comprising the steps of:

receiving a first signal stream having a predetermined transmission rate;

subrate-demultiplexing the first signal stream, which comprises a plurality of adjacent frames each having an identical sequence of time slots of equal duration, each time slot of each frame including a framing bit and each one of the plurality of adjacent frames including an identical first framing pattern comprising a sequence of values of the framing bits, with different ones of the time slots of a frame carrying signals from different ones of second signal streams each at a subrate of the transmission rate of the first signal stream and with sequentially identical time slots of a plurality of the adjacent frames carrying signals from the same second signal stream, into the plurality of second signal streams, by executing a program in a general-purpose programmable processor that causes the processor to perform the steps of storing at least one complete received frame of the first signal stream in memory means of the processor which also stores a plurality of second framing patterns each comprising at least one complete first framing pattern rotated by a different number of the framing bits than another second framing pattern, comparing in the processor a third framing pattern, comprising a sequence of the values of the framing bits of time slots of the stored at least one complete received frame, with individual ones of the second framing patterns, determining in the processor, from a match between the third framing pattern and one of the second framing patterns, which second signal stream's signals any time slot of the stored at least one complete received frame is carrying, and sending for transmission on different links the stored time slots determined to carry signals of different second signals streams; and transmitting the plurality of the second signal streams each at its own subrate.

16. A subrate demultiplexer comprising means for receiving a first signal stream having a predetermined transmission rate;

a general-purpose programmable processor connected to the receiving means and programmed to subrate-demultiplex the first signal stream, which comprises a plurality of adjacent frames each having an identical sequence of time slots of equal duration, each time slot of each frame including a framing bit and each one of the plurality of adjacent frames including an identical first framing pattern comprising a sequence of values of the framing bits, with different ones of the time slots of a frame carrying signals from different ones of second signal streams each at a subrate of the transmission rate of the first signal stream and with sequentially identical time slots of a plurality of the adjacent frames carrying signals from the same second signal stream, into the plurality of second signal streams, the processor including memory means for storing at least one complete received frame of the first signal stream, and memory means for storing a plurality of second framing patterns each comprising at least one complete first framing pattern rotated by a different number of the framing bits than another second framing pattern, and the processor being programmed (a) to compare a third framing pattern, comprising a sequence of the values of the framing bits of time slots of the stored at least one complete received frame, with individual ones of the second framing patterns, (b) to determine, from a match between the third framing pattern and one of the second framing patterns, which second signal stream's signals any time slot of the stored at least one complete received frame is carrying, and (c) to arrange into different second signal streams the stored time slots determined to carry signals of different second signal streams; and means for transmitting the plurality of the second signal streams each at its own subrate.

17. A method of subrate demultiplexing a first signal stream into a plurality of second signal streams, comprising the steps of:

receiving a first signal stream having a predetermined transmission rate;

subrate-demultiplexing the first signal stream, which comprises a plurality of adjacent frames each having an identical sequence of time slots of equal duration, each time slot of each frame including a framing bit and each one of the plurality of adjacent frames including an identical first framing pattern comprising a sequence of values of the framing bits, with different ones of the time slots of a frame carrying signals from different ones of second signal streams each at a subrate of the transmission rate of the first signal stream and with sequentially identical time slots of a plurality of the adjacent frames carrying signals from the same second signal stream, into the plurality of second signal streams, by executing a program in a general-purpose programmable processor that causes the processor to perform the steps of storing at least one complete received frame of the first signal stream in memory means of the processor which also stores a plurality of second framing patterns each comprising at least one complete first framing pattern rotated by a different number of the framing bits than another second framing pattern, comparing in the processor a third framing pattern, comprising a sequence of the values of the framing bits of time slots of the stored at least one complete received frame, with individual ones of the second framing patterns, determining in the processor, from a match between the third framing pattern and one of the second framing patterns, which second signal stream's signals any time slot of the stored at least one complete received frame is carrying, and arranging into different second signals streams the stored time slots determined to carry signals of the different second signal streams; and transmitting the plurality of the second signal streams each at its own subrate.

* * * * *